(12) United States Patent
Laframboise et al.

(10) Patent No.: US 8,991,930 B2
(45) Date of Patent: Mar. 31, 2015

(54) CLOSED CELL FOAM VEHICLE INTERIOR COMPONENT AND METHOD OF MAKING SAME

(75) Inventors: Gregg Laframboise, Windsor (CA); Scott E. Dluge, Ann Arbor, MI (US); Daniel J. Koester, Ann Arbor, MI (US); David Thimm, Plymouth, MI (US); Duane Potes, Jr., Adrian, MI (US); Sheraine Sabbagh, Ann Arbor, MI (US); John Gomez, Howell, MI (US); Joon Kyu Lee, Farmington, MI (US); Richard P. Doerer, Royal Oak, MI (US); Emery Jay Zadina, Ypsilanti, MI (US); Kurt G. Lusko, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 201 days.

(21) Appl. No.: 12/564,551

(22) Filed: Sep. 22, 2009

(65) Prior Publication Data
US 2010/0171346 A1    Jul. 8, 2010

Related U.S. Application Data

(60) Provisional application No. 61/192,728, filed on Sep. 22, 2008.

(51) Int. Cl.
| | |
|---|---|
| *A47C 7/00* | (2006.01) |
| *B60N 2/64* | (2006.01) |
| *B29C 44/12* | (2006.01) |
| *B29C 65/66* | (2006.01) |
| *B29C 65/00* | (2006.01) |
| *B60N 2/44* | (2006.01) |
| *B60N 2/70* | (2006.01) |

(Continued)

(52) U.S. Cl.
CPC .............. *B60N 2/643* (2013.01); *B29C 44/12* (2013.01); *B29C 65/665* (2013.01); *B29C 66/727* (2013.01); *B29C 66/742* (2013.01); *B60N 2/449* (2013.01); *B60N 2/646* (2013.01); *B60N 2/7017* (2013.01); *B60R 7/043* (2013.01); *B29K 2023/083* (2013.01); *B29K 2105/04* (2013.01); *B29K 2105/046* (2013.01); *B29L 2031/3026* (2013.01); *B29L 2031/3035* (2013.01); *B29L 2031/771* (2013.01)
USPC .............. 297/440.2; 297/440.22; 297/452.32; 297/452.26

(58) Field of Classification Search
USPC ............. 297/452.17, 452.48, 452.26, 452.32, 297/452.35
See application file for complete search history.

(56) References Cited

U.S. PATENT DOCUMENTS 2,837,144 A * 6/1958 Heller ............................... 5/402
2,838,100 A * 6/1958 Follows .................... 297/452.17
(Continued)

FOREIGN PATENT DOCUMENTS

DE    102008037231 A1 *  2/2010 ............... B60N 2/58
FR        2895337 A1 *  6/2007 ............... B60N 2/58

*Primary Examiner* — David E Allred
(74) *Attorney, Agent, or Firm* — Dickinson Wright PLLC

(57) ABSTRACT

A vehicle seat assembly including at least a component of the seat assembled made of closed-cell foam and having an integral exterior surface. The component may include a backrest, headrest, seat cushion or a component thereof such as an armrest. A method of forming a seat assembly including a first seat component and a second seat component wherein at least one of the first and the second components are made of closed-cell foam.

17 Claims, 30 Drawing Sheets

(51) Int. Cl.
*B60R 7/04* (2006.01)
*B29K 23/00* (2006.01)
*B29K 105/04* (2006.01)
*B29L 31/30* (2006.01)
*B29L 31/00* (2006.01)

(56) References Cited

U.S. PATENT DOCUMENTS

| | | | | |
|---|---|---|---|---|
| 2,845,997 A * | 8/1958 | Waite | | 297/452.17 |
| 3,529,866 A * | 9/1970 | Getz | | 297/452.53 |
| 3,612,607 A * | 10/1971 | Lohr | | 297/452.27 |
| 3,663,057 A * | 5/1972 | Lohr et al. | | 297/452.14 |
| 3,694,030 A * | 9/1972 | Grosfillex | | 297/448.1 |
| 3,752,533 A * | 8/1973 | Gilbert | | 297/447.1 |
| 3,819,232 A * | 6/1974 | Wagner | | 297/452.21 |
| 3,874,731 A * | 4/1975 | Jordan | | 297/452.52 |
| 3,878,277 A * | 4/1975 | Velte | | 264/46.4 |
| 3,924,893 A * | 12/1975 | Ferrara | | 297/452.46 |
| 3,947,068 A * | 3/1976 | Buhk | | 297/450.1 |
| 4,032,191 A * | 6/1977 | Fetsch | | 297/440.22 |
| 4,152,023 A * | 5/1979 | Buhk | | 297/452.2 |
| 4,558,904 A * | 12/1985 | Schultz | | 297/440.11 |
| 4,632,459 A * | 12/1986 | Herschlag | | 297/440.1 |
| 4,639,042 A * | 1/1987 | Lange | | 297/440.2 |
| 4,728,119 A * | 3/1988 | Sigafoo | | 280/657 |
| 4,829,644 A * | 5/1989 | Kondo et al. | | 29/91.1 |
| 4,844,541 A * | 7/1989 | Laird | | 297/302.4 |
| 4,880,276 A * | 11/1989 | Shovar | | 297/452.2 |
| 4,900,085 A * | 2/1990 | Tobler | | 297/452.38 |
| 5,035,467 A * | 7/1991 | Axelson et al. | | 297/440.22 |
| 5,048,894 A * | 9/1991 | Miyajima et al. | | 297/452.11 |
| 5,425,567 A * | 6/1995 | Albecker, III | | 297/377 |
| 5,544,942 A * | 8/1996 | Vu Khac et al. | | 297/452.37 |
| 5,599,069 A * | 2/1997 | Lorbiecki | | 297/452.15 |
| 5,647,637 A * | 7/1997 | Jay et al. | | 297/354.12 |
| 5,711,576 A * | 1/1998 | Olson et al. | | 297/353 |
| 5,826,946 A * | 10/1998 | Matthews et al. | | 297/452.57 |
| 5,879,055 A * | 3/1999 | Dishner et al. | | 297/452.38 |
| 5,954,395 A * | 9/1999 | Moulins et al. | | 297/218.4 |
| 6,003,948 A * | 12/1999 | Holbrook | | 297/440.15 |
| 6,139,710 A * | 10/2000 | Powell | | 204/673 |
| 6,241,188 B1 * | 6/2001 | Simpson et al. | | 244/122 R |
| 6,257,665 B1 * | 7/2001 | Nagamitsu et al. | | 297/285 |
| 6,262,646 B1 * | 7/2001 | Van Zeeland | | 335/205 |
| 6,279,999 B1 * | 8/2001 | Lee et al. | | 297/452.62 |
| 6,312,054 B1 * | 11/2001 | Scheurer et al. | | 297/373 |
| 6,382,717 B1 * | 5/2002 | Yasui et al. | | 297/216.13 |
| 6,543,844 B1 * | 4/2003 | Ryan et al. | | 297/219.12 |
| 6,585,321 B1 * | 7/2003 | Taguchi et al. | | 297/344.1 |
| 6,783,181 B2 * | 8/2004 | Scheurer et al. | | 297/373 |
| 7,182,401 B2 * | 2/2007 | Scheurer et al. | | 297/219.1 |
| 8,011,043 B2 * | 9/2011 | Graebe et al. | | 5/653 |
| 8,096,621 B2 * | 1/2012 | Braun | | 297/440.15 |
| 8,104,840 B2 * | 1/2012 | Tarumi et al. | | 297/452.48 |
| 8,360,530 B2 * | 1/2013 | Onoda et al. | | 297/452.27 |
| 8,782,835 B2 * | 7/2014 | Pozzi | | 5/653 |
| 2001/0002648 A1 * | 6/2001 | Van Zeeland | | 200/520 |
| 2001/0002649 A1 * | 6/2001 | Zeeland et al. | | 200/520 |
| 2001/0026203 A1 * | 10/2001 | Van Zeeland | | 335/205 |
| 2002/0149246 A1 * | 10/2002 | Lucci et al. | | 297/300.1 |
| 2003/0090139 A1 * | 5/2003 | Kown | | 297/446.2 |
| 2003/0127887 A1 * | 7/2003 | Laws et al. | | 297/55 |
| 2004/0064894 A1 * | 4/2004 | Labish | | 5/655.9 |
| 2004/0084940 A1 * | 5/2004 | Morita | | 297/253 |
| 2004/0155512 A1 * | 8/2004 | Nakamura | | 297/452.26 |
| 2005/0029766 A1 * | 2/2005 | Ierfone et al. | | 280/87.042 |
| 2005/0099052 A1 * | 5/2005 | Bertolini et al. | | 297/440.1 |
| 2005/0245878 A1 * | 11/2005 | Mernoe et al. | | 604/180 |
| 2005/0273059 A1 * | 12/2005 | Mernoe et al. | | 604/180 |
| 2006/0061190 A1 * | 3/2006 | Fukuda et al. | | 297/440.1 |
| 2007/0126274 A1 * | 6/2007 | Takahashi et al. | | 297/452.21 |
| 2007/0126275 A1 * | 6/2007 | Williams et al. | | 297/452.26 |
| 2007/0278842 A1 * | 12/2007 | Ikai et al. | | 297/452.14 |
| 2008/0018162 A1 * | 1/2008 | Galbreath et al. | | 297/452.26 |
| 2008/0032795 A1 * | 2/2008 | Sternberg et al. | | 463/36 |
| 2008/0054702 A1 * | 3/2008 | Ali et al. | | 297/452.26 |
| 2008/0136240 A1 * | 6/2008 | Matthews et al. | | 297/354.1 |
| 2009/0085384 A1 * | 4/2009 | Galbreath et al. | | 297/218.1 |
| 2009/0302664 A1 * | 12/2009 | Galbreath et al. | | 297/452.48 |
| 2010/0019554 A1 * | 1/2010 | Mahal et al. | | 297/216.11 |
| 2010/0038952 A1 * | 2/2010 | Tsuji et al. | | 297/452.48 |
| 2011/0089742 A1 * | 4/2011 | Takahashi et al. | | 297/452.48 |
| 2011/0133525 A1 * | 6/2011 | Oota | | 297/180.14 |
| 2011/0137238 A1 * | 6/2011 | Mernoe et al. | | 604/66 |
| 2011/0278902 A1 * | 11/2011 | Galbreath et al. | | 297/452.48 |
| 2012/0261975 A1 * | 10/2012 | Cathcart et al. | | 297/452.48 |
| 2012/0299362 A1 * | 11/2012 | Puyol Carbonell et al. | | 297/463.1 |
| 2013/0300178 A1 * | 11/2013 | Murata et al. | | 297/452.18 |
| 2014/0077524 A1 * | 3/2014 | Gutierrez et al. | | 296/153 |

* cited by examiner

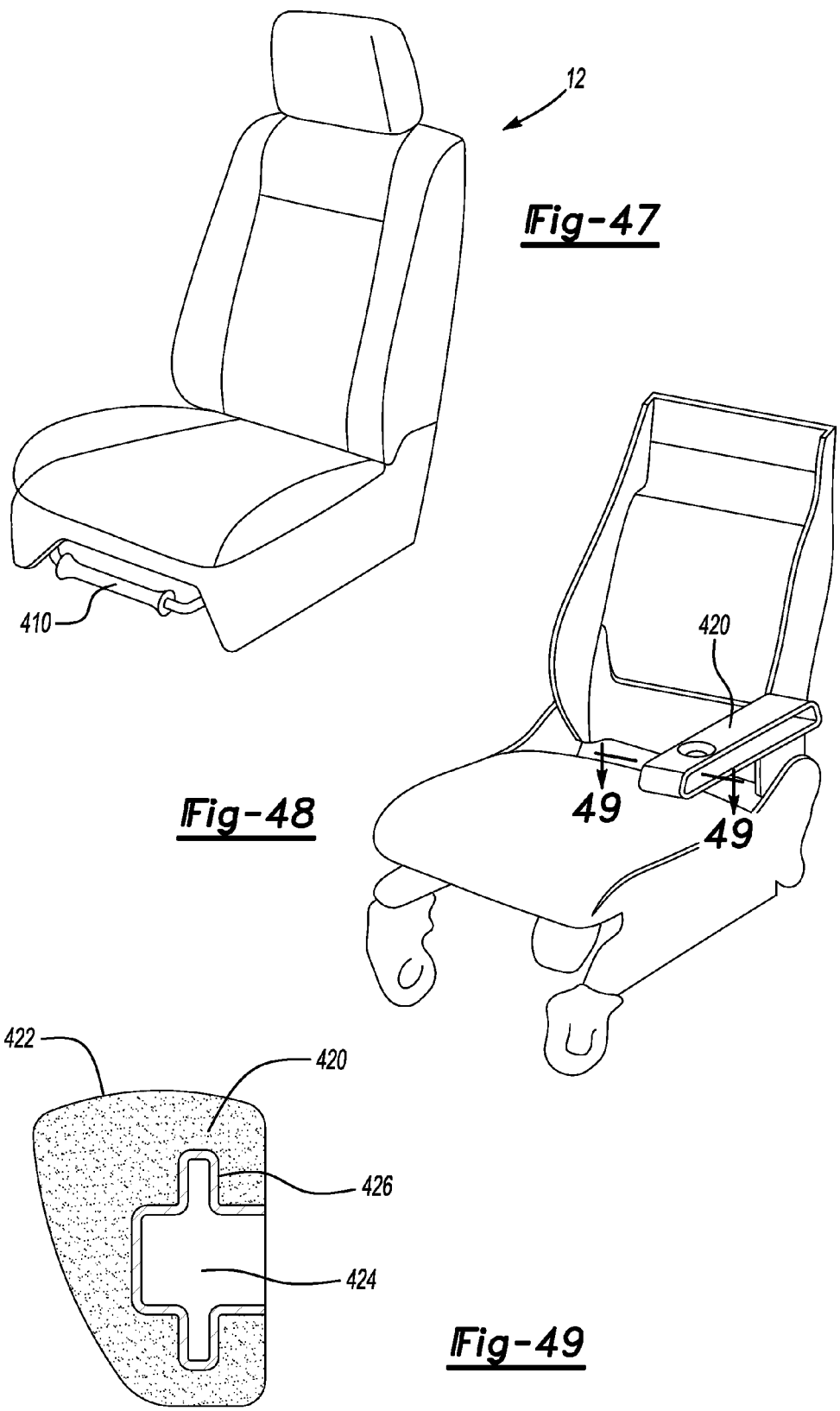

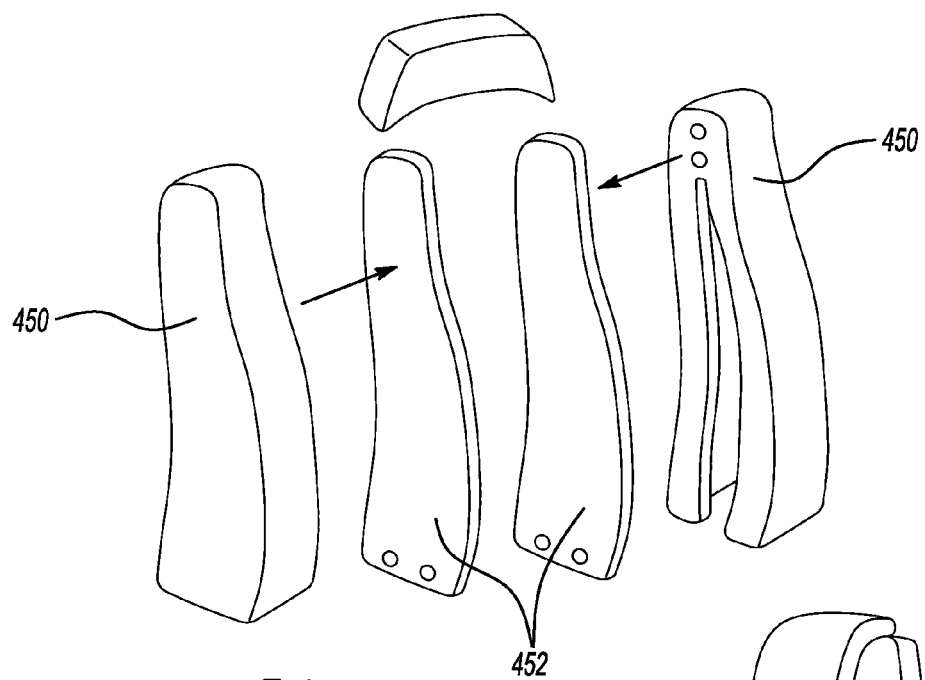
Fig-54
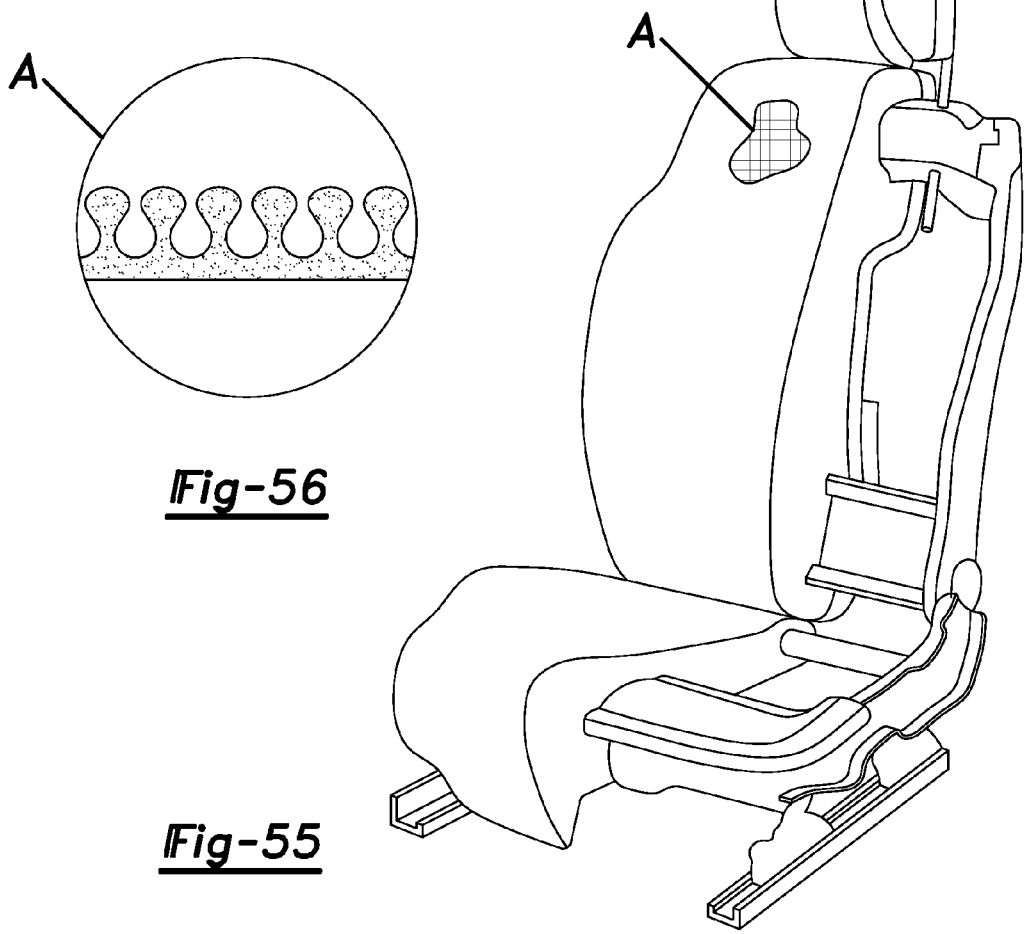
Fig-56
Fig-55

CLOSED CELL FOAM VEHICLE INTERIOR COMPONENT AND METHOD OF MAKING SAME

CROSS REFERENCE TO RELATED APPLICATION

This application claims the benefit of U.S. Provisional Patent Application Ser. No. 61/192,728 filed Sep. 22, 2008, entitled "Soft Trim Redefinition Using EVA/Closed Cell Self-Skinning Foam," the entire disclosure of this application being incorporated by reference.

BACKGROUND OF THE INVENTION

1. Field of the Invention

This invention relates to various applications and concepts useful in the production of soft trim components such as typically found in the interior passenger compartment region of vehicles. More particularly, the invention relates to the use of a closed cell foam material, such as EVA, in the formation of seating, console and sun visor type components in a motor vehicle. Throughout this document, the terms "EVA" and "closed cell foam" are intended to be understood as generally synonymous.

2. Discussion

EVA (ethylene-vinyl acetate copolymer resin) is a petroleum-based foam product commercially available under various trade names, including but not limited to Levirex and PolyCell. EVA polymers have been used to form various consumer grade articles in an injection molding or extrusion process. A particular advantage of closed cell foam materials (like EVA) resides in the fact that EVA polymers become cross-linked during the molding process, or separate cooking process, which results in a very stable part. Due to the properties of EVA materials, it is typical for the molded part to rapidly expand upon mold separation, thereby usually resulting in a self-ejecting part. As the molded part cools, it shrinks and typically returns to an as-molded (or scaled design) size.

Known consumer applications of EVA molded products include clog-style shoes, clothing items, boot inserts, tires, and numerous other applications. The self-skinning foam creates a single-material finished part directly out of the mold. After molding, EVA material can be sewn using traditional machinery. Heating EVA and other post-forming techniques allow for custom fit opportunities.

Some prior art applications have taken advantage of the substantially expanded condition of an EVA part immediately after it is removed from a mold. For example, the prior art has taught to manufacturer light duty tires from an EVA compound. Such light duty tires have a substantially solid annular configuration with a tread portion disposed about the outer periphery. Prior to cooling, a wheel hub rim is inserted inside the annular tire and held there until the molded EVA portion cools and shrinks to a snug fit over the hub. In this manner, the EVA tire becomes permanently installed by way of mechanical lock, having hot shrunk into its final assembled condition on the hub.

Other uses of EVA materials have also been proposed, including the use in vehicular seat applications such as depicted in FIG. 3 of the accompanying drawings. Here, the so called "Metacar" product launched in Italy in 2006 includes bucket seat assemblies in which some of the interior soft trim portions of the seat and backrest have been manufactured from EVA molded compounds. In another example, U.S. publication number 2004/0155512 depicts a vehicle seat assembly in which certain soft trim portions may be fabricated from a foamed product of various sorts, one selection of which being an EVA material. In this example, the foamed product (e.g., EVA) is over-molded about the frame and other structural portions of the seat assembly. This over-molding technique is referred to as "integral molding" and described in paragraph [0050] of that patent application.

Various needs exist within the vehicle interior field of endeavor, including the desire for simplified/reduced foam and trim development processes, reduced seat assembly times, improved craftsmanship, unique styling opportunities, easily cleaned exterior surfaces, stain resistant and antimicrobial surfaces, and soft and durable surfaces. While EVA products have been used to some extent within the interior passenger compartment of a motor vehicle, that use has not been well-developed nor has it taken full advantage of some unique characteristics found in EVA materials. Accordingly, there is a need to provide automobile manufacturers and automobile consumers with unique seating and interior trim solutions that combine the features and benefits of foam, trim and plastics in a single process. The resulting product must be easy to clean and resistant to spills and staining.

SUMMARY OF THE INVENTION

A vehicle seat assembly including a backrest, seat cushion and a foam shell made of closed-cell foam and having an integral exterior surface. The foam shell is defined to cover at least one of the backrest, seat cushion and headrest. The foam shell includes a predetermined hardness. The foam shell includes integral attachment features for mating at least two components of the seat assembly together. The foam shell includes at least one component for use with the seat assembly including, for example, an armrest.

A method of forming a seat assembly including a first seat component and a second seat component wherein at least one of the first and the second components are made of closed-cell foam.

BRIEF DESCRIPTION OF THE DRAWINGS

FIG. 47 is a perspective view of a seat;

FIG. 48 is a perspective view of a seat;

FIG. 49 is partial sectional view of a portion of the seat in FIG. 50 taken along line A-A;

FIG. 54 is a partial assembly view of a portion of a seat;

FIG. 55 is a partially assembled view of a seat;

FIG. 56 is an exploded view of the seat in FIG. 36;

DETAILED DESCRIPTION OF THE PREFERRED EMBODIMENT

Figure 1:
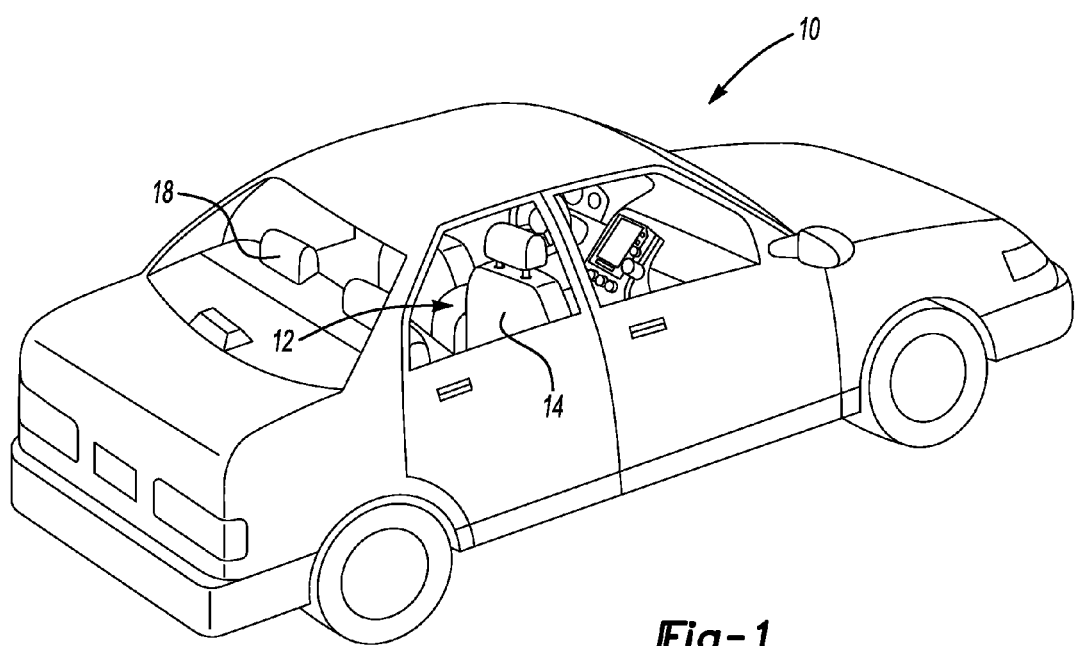
FIG. 1 is a perspective view of a vehicle.

Referring to the Figures, wherein like numerals indicate like or corresponding parts throughout the several views, an exemplary motor vehicle is shown generally at 10 in FIG. 1. The vehicle 10 is shown here in the form of a four door sedan, but it will be appreciated that the vehicle type is not relevant to the invention. The vehicle 10 includes at least one seat assembly, generally indicated at 12, of the type including a backrest hingedly connected to a seat cushion. The seat cushion is anchored to the floor of the passenger compartment using any of the various anchoring techniques, such as fore and aft adjustable slides, releasable hooks, fixed mounts, and the like.

Figures 2, 3:
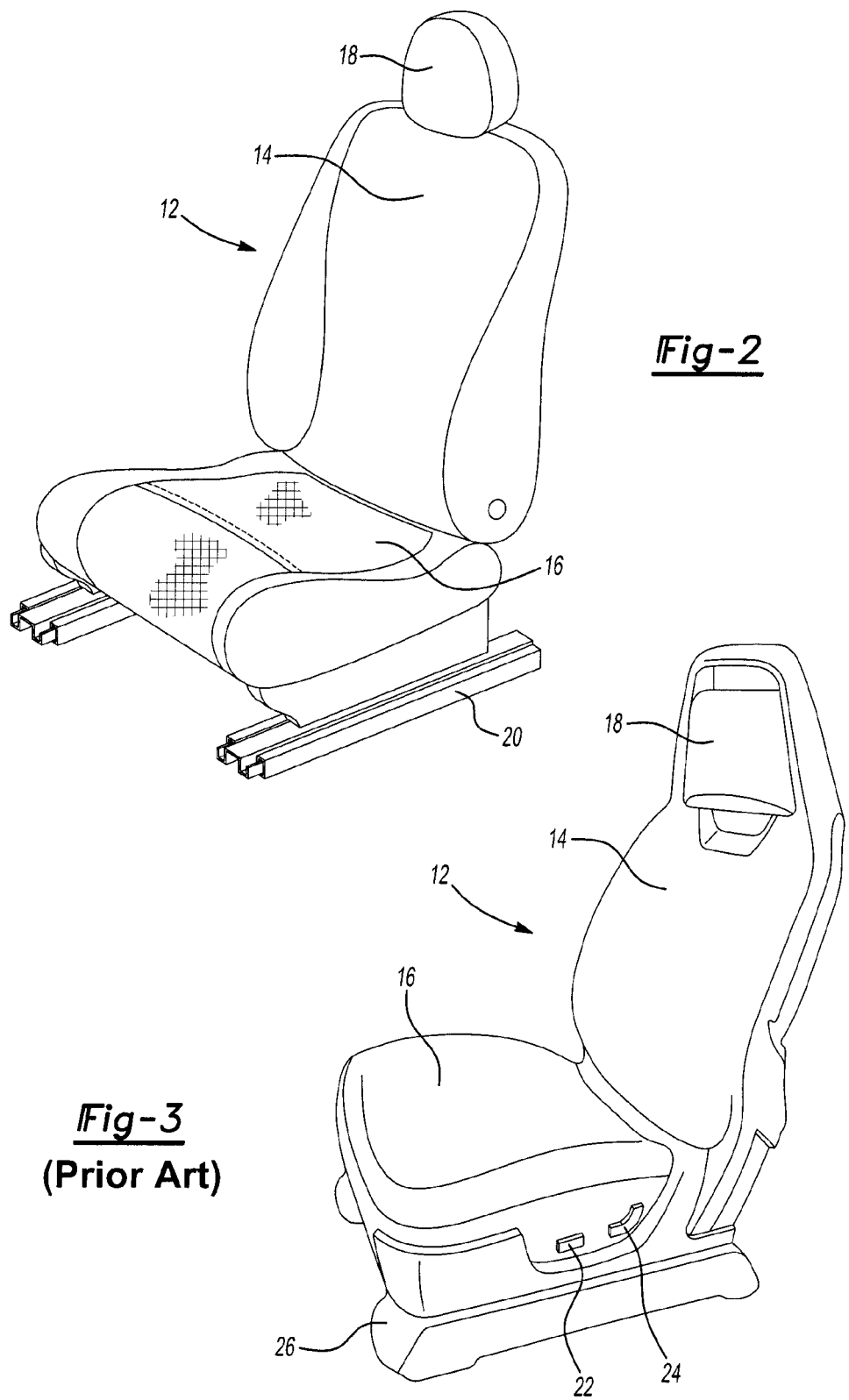
FIG. 2 is a perspective view of a seat for use in a vehicle.
FIG. 3 is a perspective view of a seat made with foam for use in a vehicle.

FIGS. 2-5 show the seat assembly having a backrest 14 connected to a seat cushion 16 and a headrest 18. As seen in FIG. 2, the seat assembly 12 is anchored to the floor of the passenger compartment often with use of a seat track 20 permitting fore and aft movement of the seat assembly. FIG. 3 shows the seat assembly 12 including electronics switches 22 and 24 for use by the operator in actuating movement of the seat assembly 12. Also, as seen in FIG. 3, the seat assembly 12 can be mounted to the vehicle floor with pedestals 26. In this example, the pedestals 26 are shown having a trim panel covering a frame portion of the pedestals 26.

In most cases the backrest 14 and the seat cushion 16 include a frame-like structure for supporting the occupant covered by various trim components for looks and comfort. For example, in some cases the seat cushion 16 includes a foam cushion fitted to the frame-like structure having a trim such as leather-like material covering both the foam cushion and the frame-like structure.

Alternatively, the backrest 14, seat cushion 16 and the headrest 18 can be formed as a closed-cell foam shell from a material which provides support, such as the frame-like metal structure of a conventional seat, while also providing comfort and an aesthetically appealing exterior surface. An EVA type closed cell, self-skinning product is durable and chemically resistant. One particular manufacturer of EVA products markets under the brand name PolyCell and PolyCellT. Benefits of closed cell foam (EVA) seat assemblies include: self-skinning foam in which no trim cover is required, undercuts that allow for molded-in attachment features, reduced labor costs, the ability to match any color, grain or texture, UV stability, cross-sections as thin as 1-2 millimeters, and molded-in branding features without secondary materials or operations being required.

Figure 4:
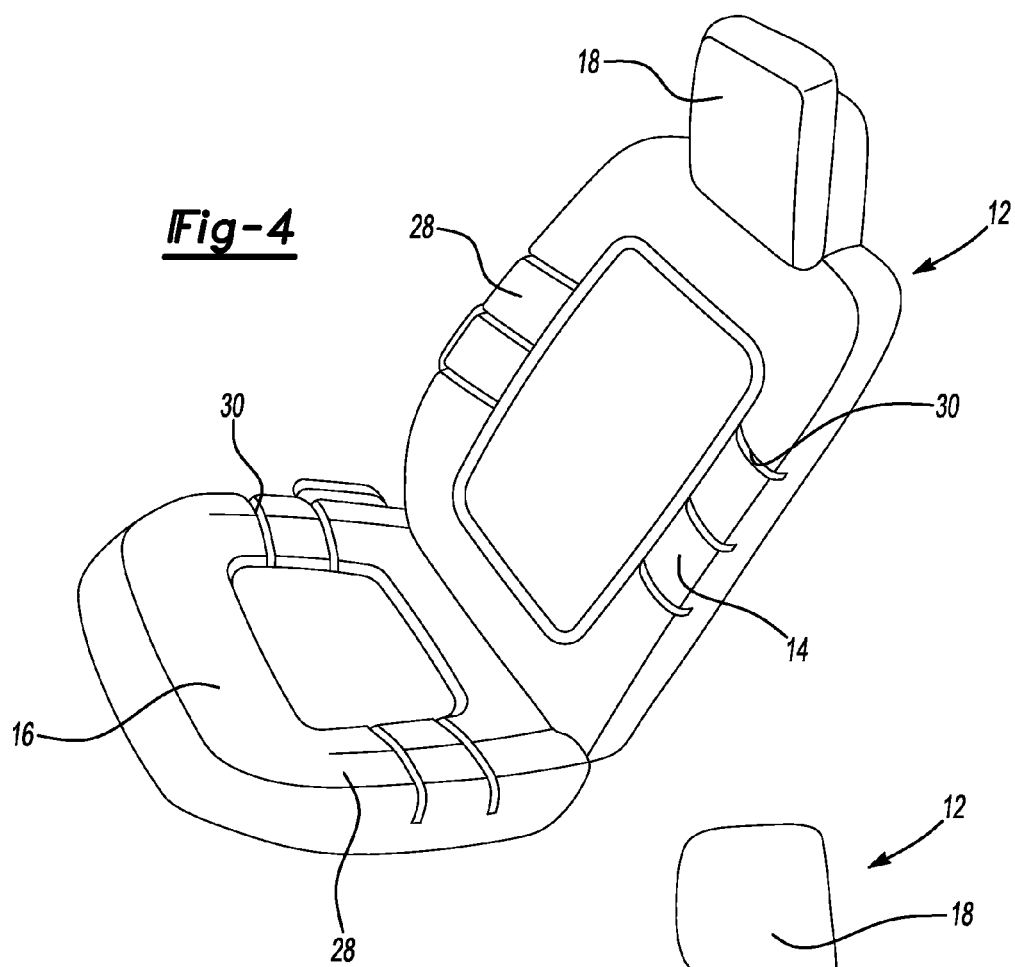
FIG. 4 is a perspective view of a seat made with foam for use in a vehicle.

FIG. 4 shows such a seat assembly 12 having the backrest 14, seat cushion 16 and the headrest 18 formed from a closed-cell foam. In this example, the seat assembly 12 can also have certain predetermined portions formed with bolster support 28. In addition, since the seat assembly 12 is formed from a closed-cell foam such as an EVA material, certain surface contours can be integrally formed to provide function and aesthetic benefits. In this example shown in FIG. 4, the surface is formed with channel-like portions 30 extending outward toward an edge of the seat assembly 12 to provide air movement while the occupant is using the seat assembly 12.

Figure 5:
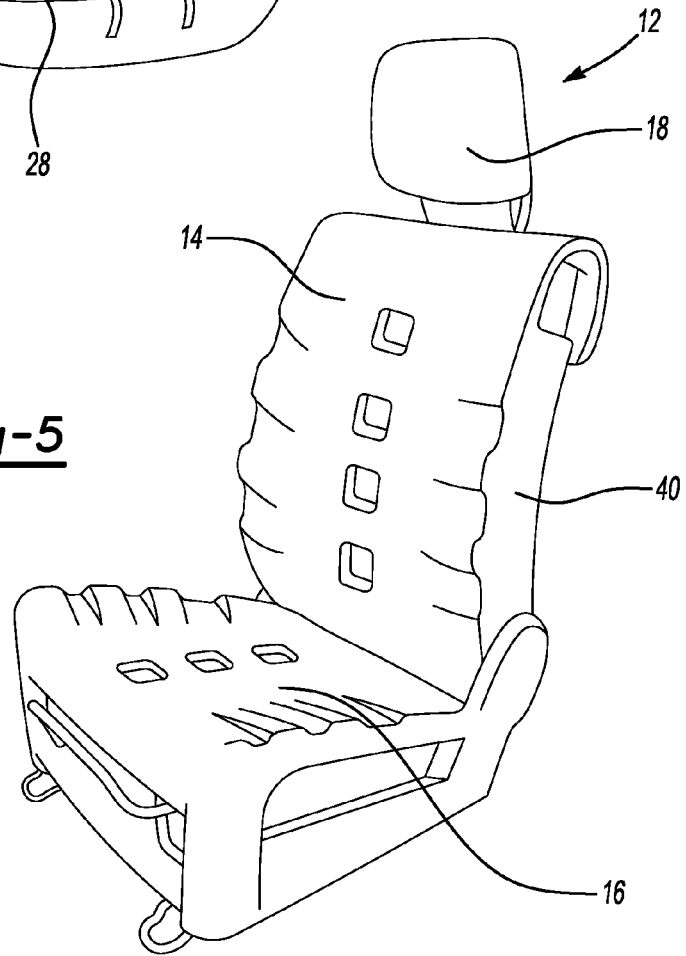
FIG. 5 is a perspective view of a seat made at least partially with foam for use in a vehicle.

FIG. 5 shows the seat assembly 12 having a foam shell 40 made of closed-cell foam for use with the backrest 14, seat cushion 16 and head rest 18. In this example, the foam shell 40 is used to cover the frame-like structure, described more fully below, while providing comfort and an aesthetically appealing exterior surface.

Figure 6:
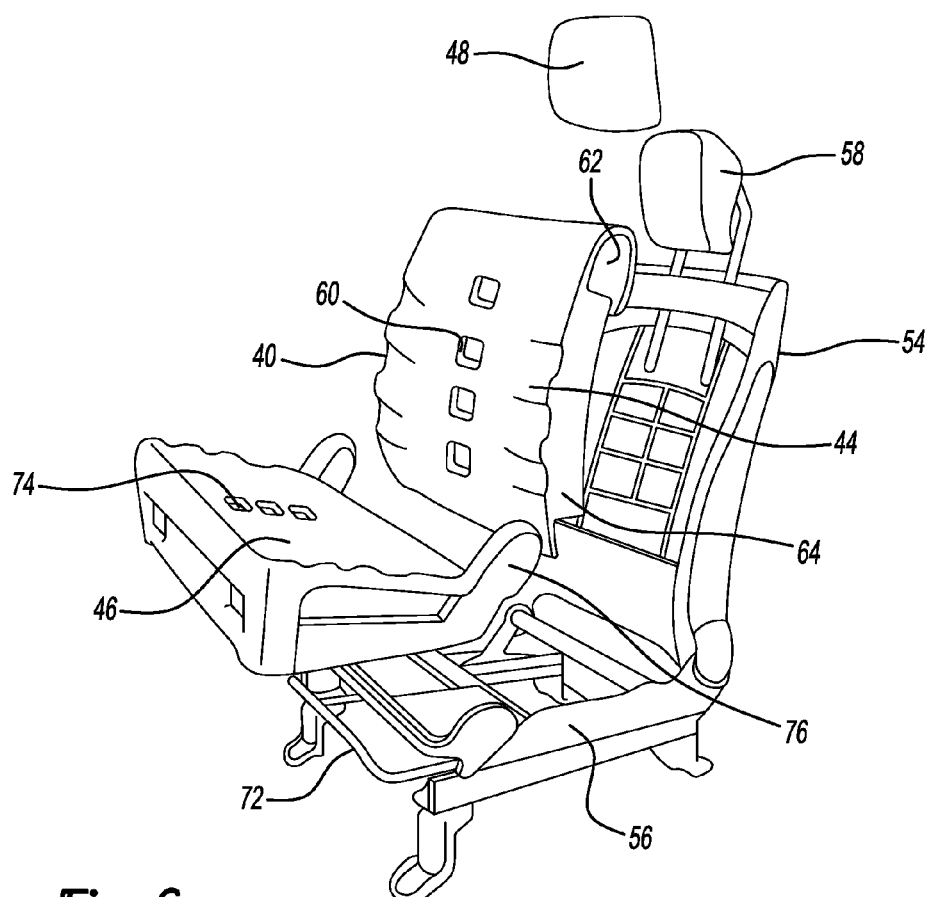
FIG. 6 is an assembly view of a seat.

FIG. 6 shows the foam shell 40 of FIG. 5 partially assembled to the frame-like structure. In this embodiment, the foam shell 40 includes three sections made up of a backrest section 44, seat cushion section 46 and headrest section 48 for use in covering the frame-like structures including the backrest frame 54, seat cushion frame 56 and the headrest frame 58. Each foam shell section 44, 46 and 48 are formed from closed-cell foam material such as an EVA material. Each of such sections can be formed having a predetermined material hardness. For example, if the seat assembly 12 was designed for use in a commercial application such as a delivery van, the closed-cell foam material, along with the process parameters, may be selected to give an increased material hardness to prevent surface damage and wear due to the increased frequency of use in a commercial application.

The backrest section 44 includes apertures 60 permitting air to flow through the backrest frame 54 and the backrest section 44 of the foam shell 40. The backrest section 44 also includes a top wrap 62 and a side wrap 64. The top wrap 62 is designed to cover a top surface of the backrest frame 54 and the side wrap 64 is designed to cover at least a portion of a side surface of the backrest frame 54.

The seat cushion section 46, like the backrest section 44, is formed as a one-piece section of closed-cell foam such as an EVA material. The seat cushion section 46 includes at least a portion covering other seat assembly components such as a lever 72 used for actuating the seat assembly. The seat cushion section 46 includes apertures 74 permitting air to flow through the seat cushion frame 56 and the seat cushion section 46. The seat cushion 46 may also include a trim cover 76 integrally formed with the seat cushion section 46 for covering a recliner mechanism used for reclining the seat assembly 12.

Figure 7:
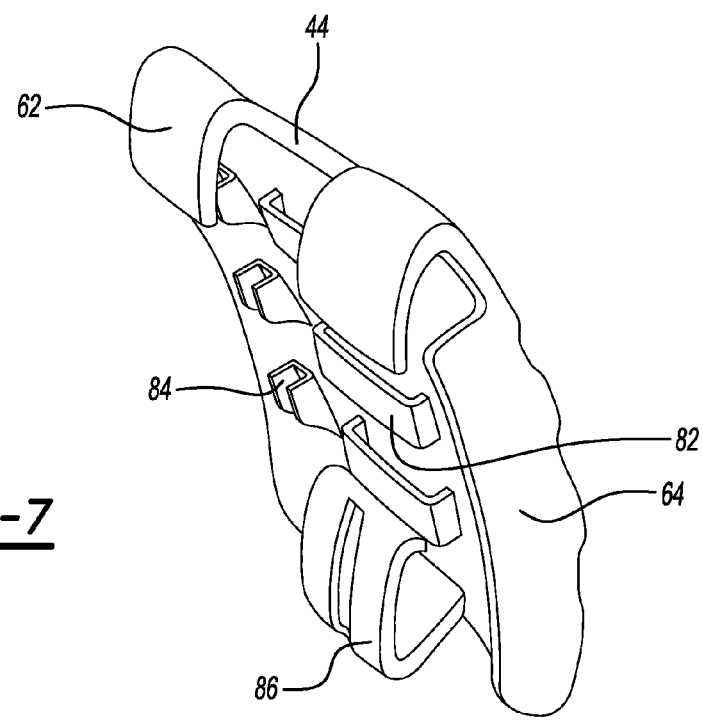
FIG. 7 is a perspective view of a seat back component of the seat assembly in FIG. 6.

The backrest section 44 of FIG. 6 is more fully shown in FIG. 7 from a rear side. The backrest section 44 includes the top wrap 62 and side wrap 64, as described above, however, the backrest section 44 also includes attachment features for attaching the backrest section 44 of the foam shell 40 to the backrest frame 54. The attachment features are formed integral with the backrest section 44 and may include, by way of example, loops 82, channels 84 or hooks 86. It should be further appreciated that the seat cushion section 46 and the headrest section 48 may also include such attachment features for retention to the applicable seat frame-like structure.

Figure 8:
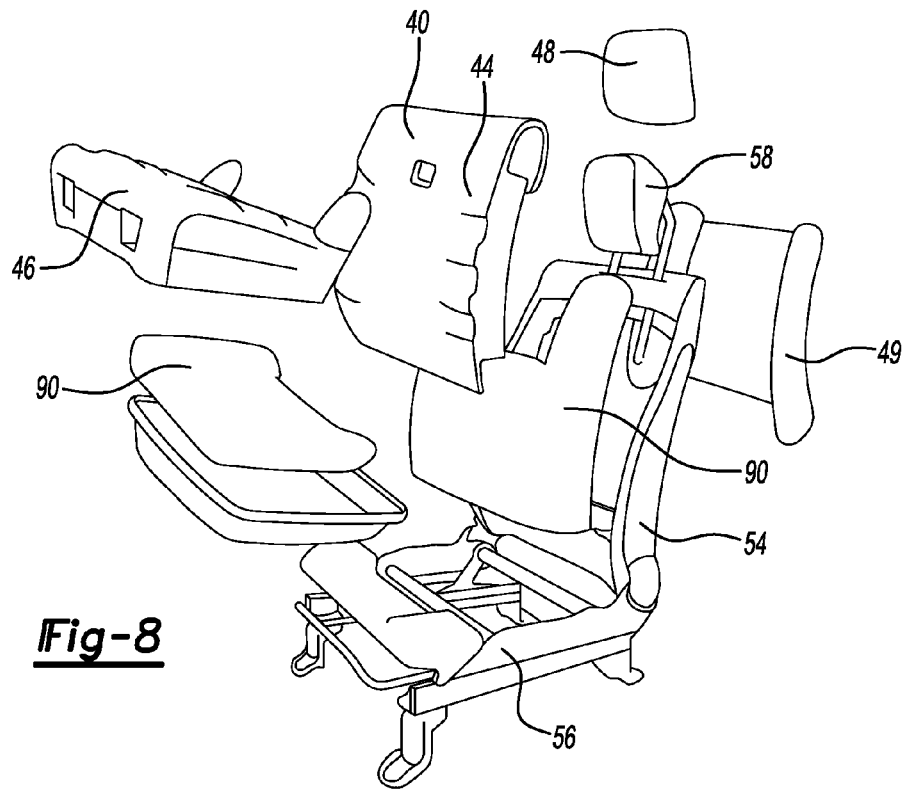
FIG. 8 is an assembly view of a seat.
Figure 9:
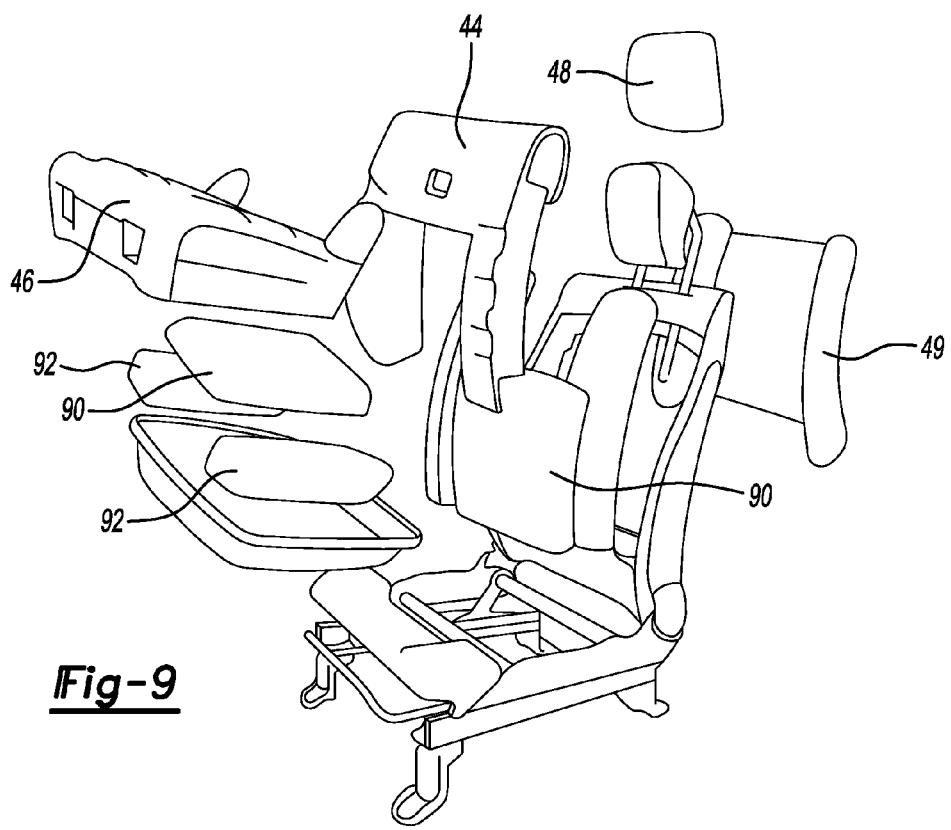
FIG. 9 is an assembly view of a seat.
Figure 10:
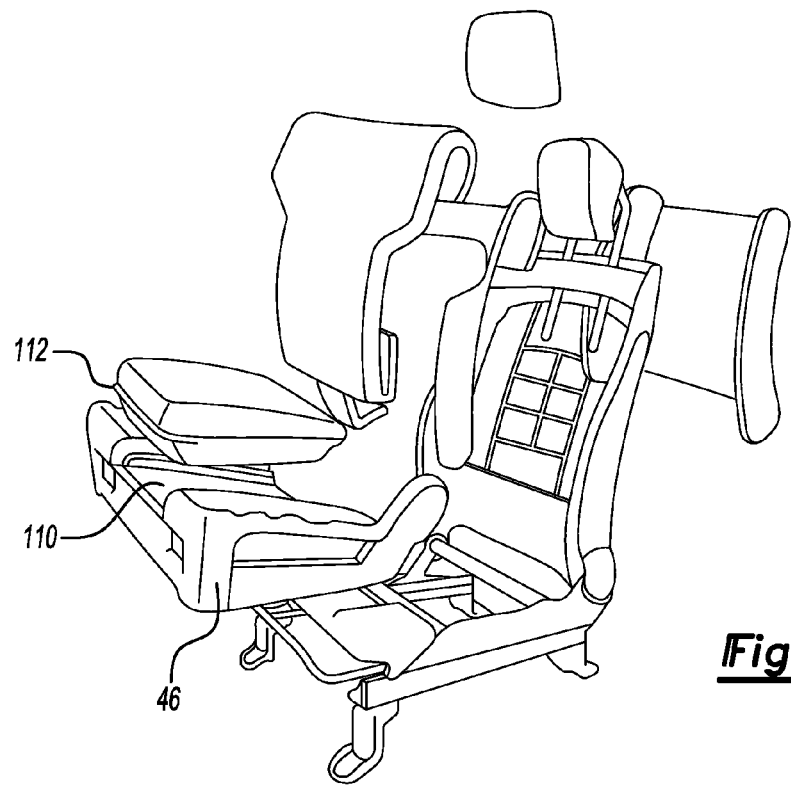
FIG. 10 is an assembly view of a seat.

The embodiment shown in FIGS. 5-7 includes the foam shell 40 used with the seat frame-like structure to complete the seat assembly 12. In other words, the foam shell 40 in that embodiment is not shown for use with other conventional components of a seat such as a foam cushion or leather trim. FIGS. 8-10 show another embodiment of the foam shell 40 used with other conventional components of a seat.

FIG. 8 shows the seat assembly 12 having a foam shell 40 including four sections made up of a backrest section 44, seat cushion section 46, headrest section 48 and a back panel section 49 for use in at least partially covering the frame-like structures including the backrest frame 54, seat cushion frame 56, the headrest frame 58 and the backrest frame 54, respectively. Each foam shell sections are formed from closed-cell foam material such as an EVA material. In this embodiment, the backrest section 44 and the seat cushion section 46 are used along with a conventional foam pad 90.

Like FIG. 8, the seat assembly 12 shown in FIG. 9 uses a foam shell 40 with conventional foam pads 90. In this example, the seat cushion section 56 is shown for use in covering a foam pad 90 along with additional foam pads 92 to provide support to the occupant laterally, also known as bolster support.

Figure 12:
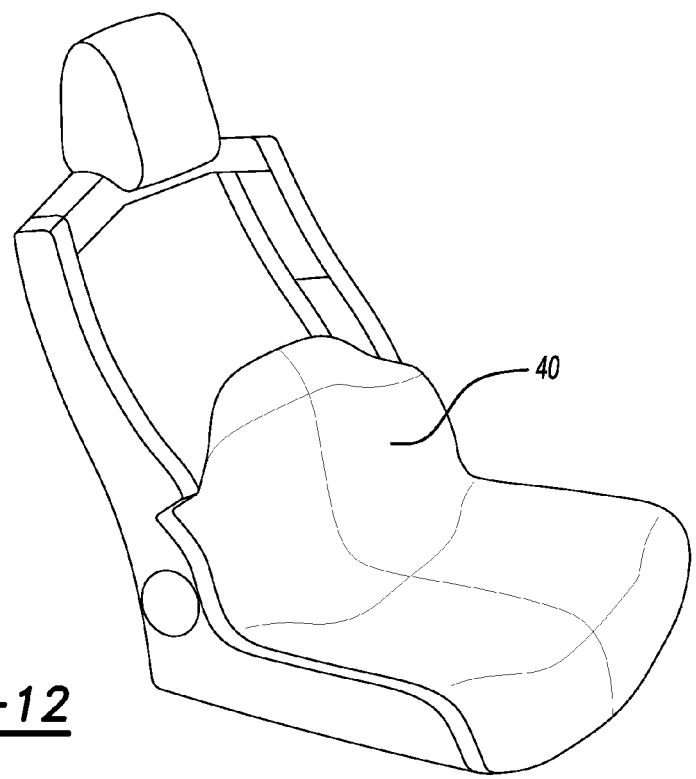
FIG. 12 is a partial assembly view of a seat.

FIG. 10 also shows the foam shell 40 used with conventional components like foam padding, however, unlike FIGS. 8 and 9, the example shown in FIG. 10 includes the foam shell 40 used only for certain exterior portions of the seat assembly 12. For example, FIG. 10 shows the seat cushion section 46 made of closed-cell foam having an insert portion 110 provided to receive a seat cushion insert 112 made of conventional foam pad and leather-like trim. As such, it should be appreciated that the foam shell 40 may also be designed for use with conventional materials of a seat assembly in predetermined areas. Similarly, FIG. 12 shows a seat assembly 12 having a foam shell 40 extending over at least a portion of the backrest or the seat cushion and used in combination with conventional materials. In this embodiment, FIG. 12 shows a portion of the foam shell extending over the seat cushion and a portion of the backrest. The foam shell is disposed for use in the backrest with other convention materials such as foam pad and trim materials.

Figure 11:
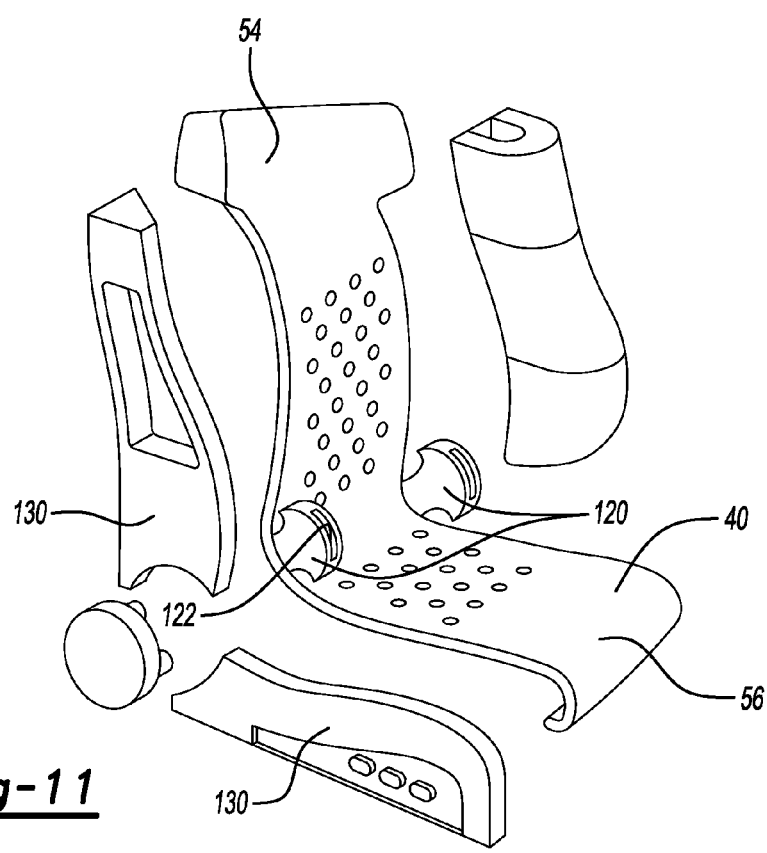
FIG. 11 is a partial assembly view of a seat.

FIG. 11 shows another embodiment of the foam shell 40 shown in FIG. 6 wherein in this embodiment the foam shell 40 includes the backrest section 54 and the seat cushion section 56 as one piece. In this embodiment the foam shell 40 is also shown having seat belt trim panels 120 formed integral with the foam shell 40. The seat belt trim panels 120 are formed to include a slot 122 to permit the seat belt (not shown) to extend therethrough in the known manner for use by an occupant. Also, as shown in FIG. 11, the foam shell 40 includes a side panel 130 also formed from a closed-cell foam such as an EVA material. The side panel 130 can be formed to cover a portion of the frame-like structure of either the backrest or the seat cushion. In this embodiment, the side panel 130 is shown including integrally formed features such as a pocket for positioning an airbag along the side of the backrest or apertures for extending knobs or electrical switches therethrough.

Figure 13:
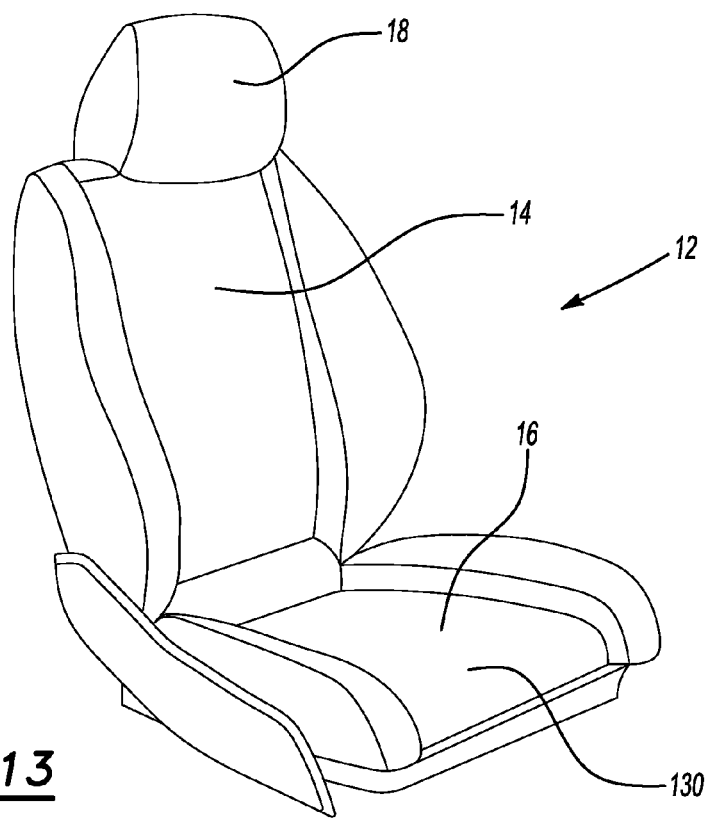
FIG. 13 is a perspective view of a seat.

The foam shell 40 may be provided with a first surface having a predetermined hardness or feel and a second surface having a predetermined hardness or feel. FIG. 13 shows a seat assembly 12 having a backrest 14, seat cushion 16 and a headrest 18. The seat cushion 16 is shown having a seat insert 130 positioned between two bolsters 132, 134. It should be appreciated that the backrest 14 may also be similarly provided with an insert positioned between two bolster portions.

Figure 14:
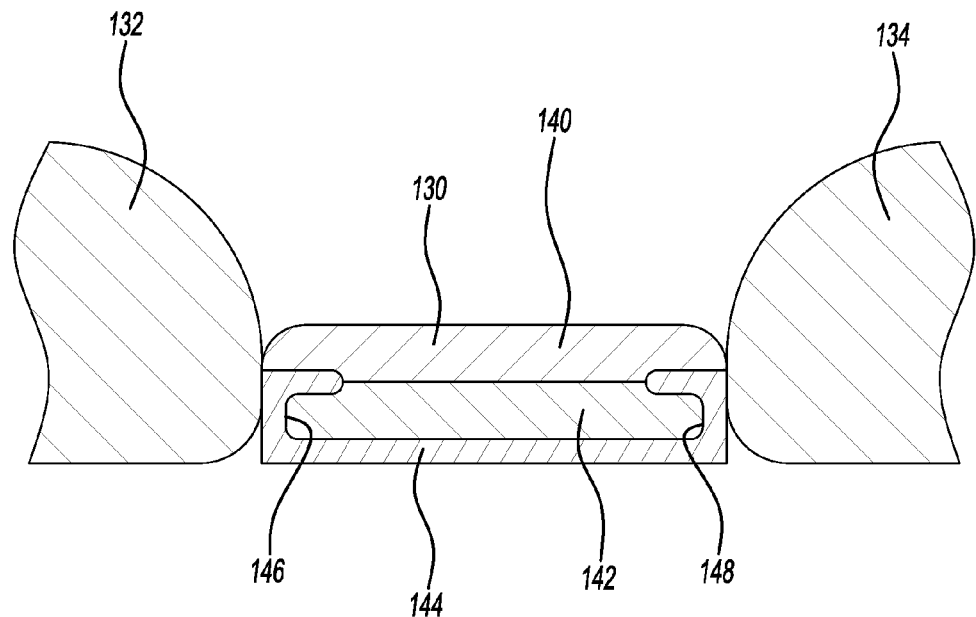
FIG. 14 is a partial sectional view of the seat in FIG. 13 taken along line A.
Figure 15:
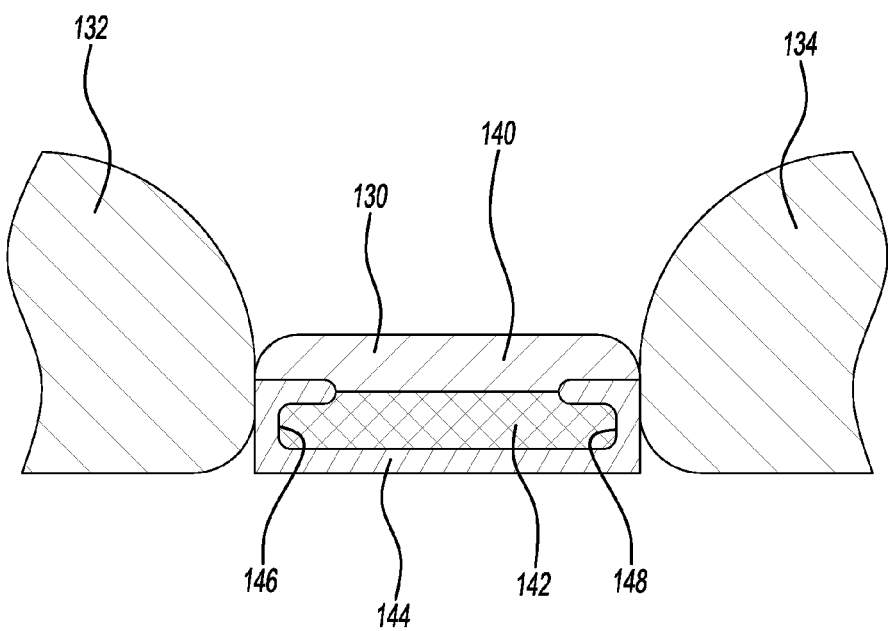
FIG. 15 is a partial sectional view of the seat in FIG. 13 taken along line A.

The seat cushion 16 with the seat insert 130 is shown in cross section in FIGS. 14 and 15. The seat insert 130 includes a first surface 140 having a predetermined hardness or look and a second surface 142 having a predetermined hardness or look. The first surface 140 can be formed to mate with the second surface 142 prior to or during assembly into the seat cushion. The seat insert 130 can be fitted to the seat cushion 16, or similarly to the backrest 14, by use of a channel 144 adapted for assembly with the seat assembly frame-like structure. The channel 144 includes at least two longitudinal tracks 146, 148 for receiving at least a portion of either the first surface 140 or the second surface 142. Since the first and second surfaces can be designed to have different hardness or looks, the occupant can interchange the first and second surfaces to permit either one to be located on the exterior or occupant side of the seat assembly. In addition, it should be appreciated that since each of the first and second sides may include a separate predetermined hardness, the resulting combination of each of such hardness in total will also provide a predetermined final seat cushion hardness.

Figure 16:
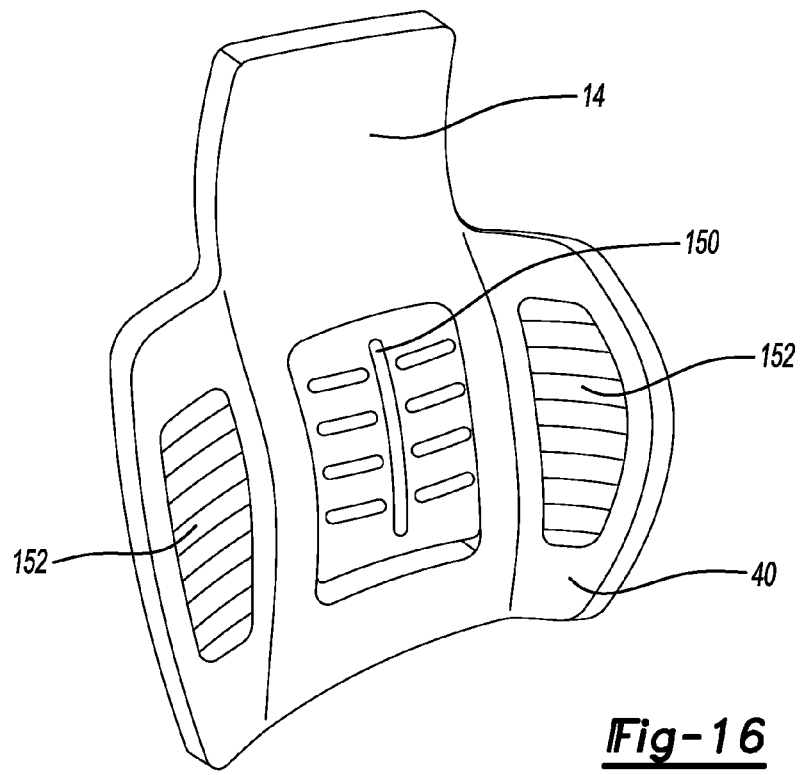
FIG. 16 is a partial assembly view of a seat.

Like the seat inserts shown in FIGS. 13-15, other portions of the seat assembly may be provided with similar inserts made of closed-cell foam to provide a desired surface look, feel or hardness. FIG. 16 shows a seat assembly 12 having a backrest 14 formed from a foam shell 40 and utilizing closed-cell foam formed inserts in the lumbar and bolster regions. The lumbar insert 150 includes integrally formed surface contour to the desired lumbar support for a given application. The bolster inserts 152 also include a formed surface contour to the desired support or look. Among other features, such inserts can include varying hardness or color. As more fully explained below, the material properties of the closed-cell foam can be utilized in the assembly of the inserts into the foam shell 40.

Figure 17:
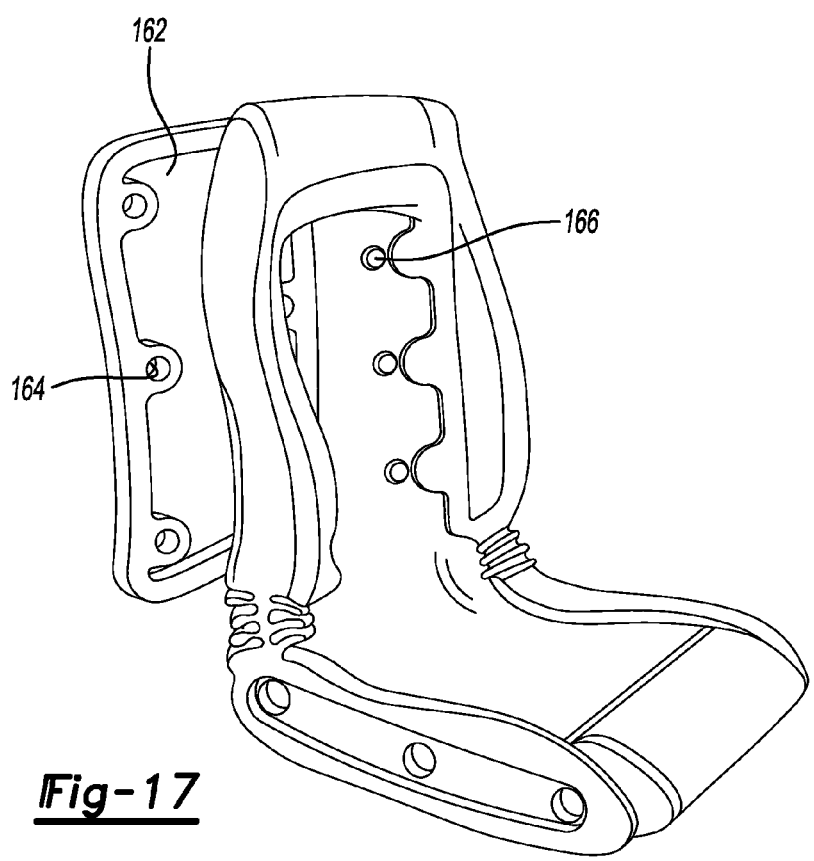
FIG. 17 is a partial assembly view of a seat.
Figure 18:
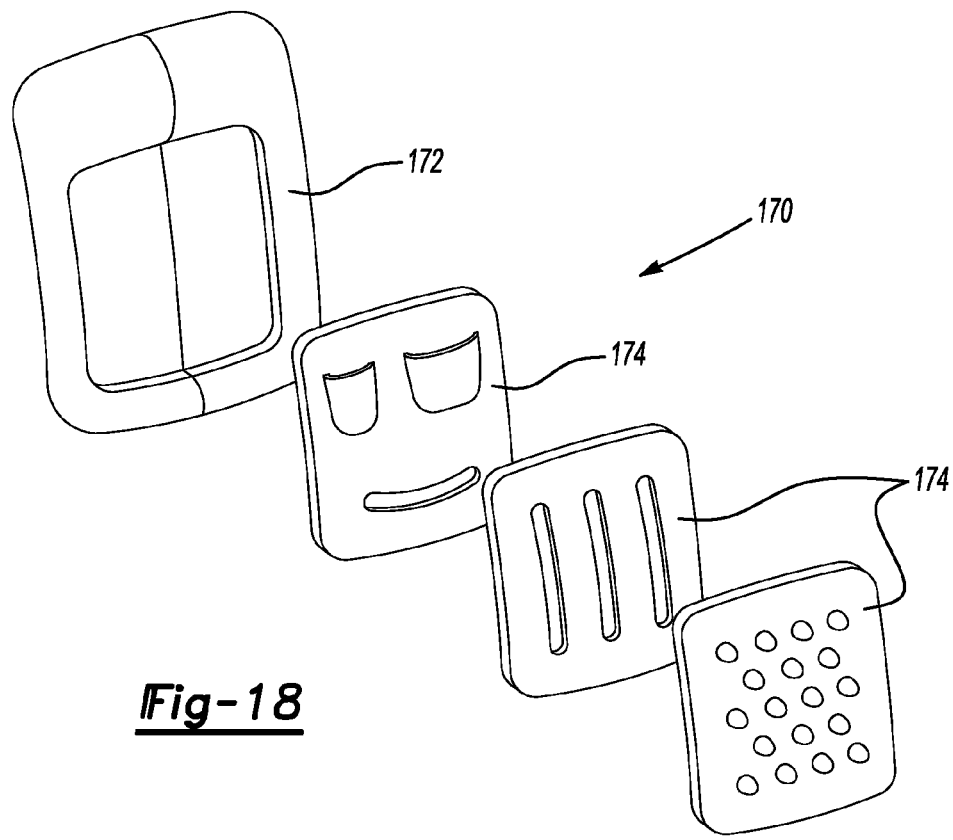
FIG. 18 is a partial assembly view of a seat.

Like other components designed for assembly to the foam shell 40, the lumbar and/or the bolster inserts may also be designed with integral attachment features for mating with similar features on the foam shell thereby permitting the inserts to be simply assembled with the seat assembly. FIGS. 17 and 18 show a foam shell configured to include attachment features for use in assembling a backpanel 162 having features for mating with such attachment features. In this embodiment, the backpanel 162 is also formed from a closed-cell foam and includes integral female mating features 164 for mating with male attachment features 166 also formed integrally on the foam shell 40. It should be appreciated that although a male and female type attachment feature is described here, other attachment features may also be integrally formed into both the foam shell 40 and the backpanel 162 including such features as a hook and loop.

Figure 19:
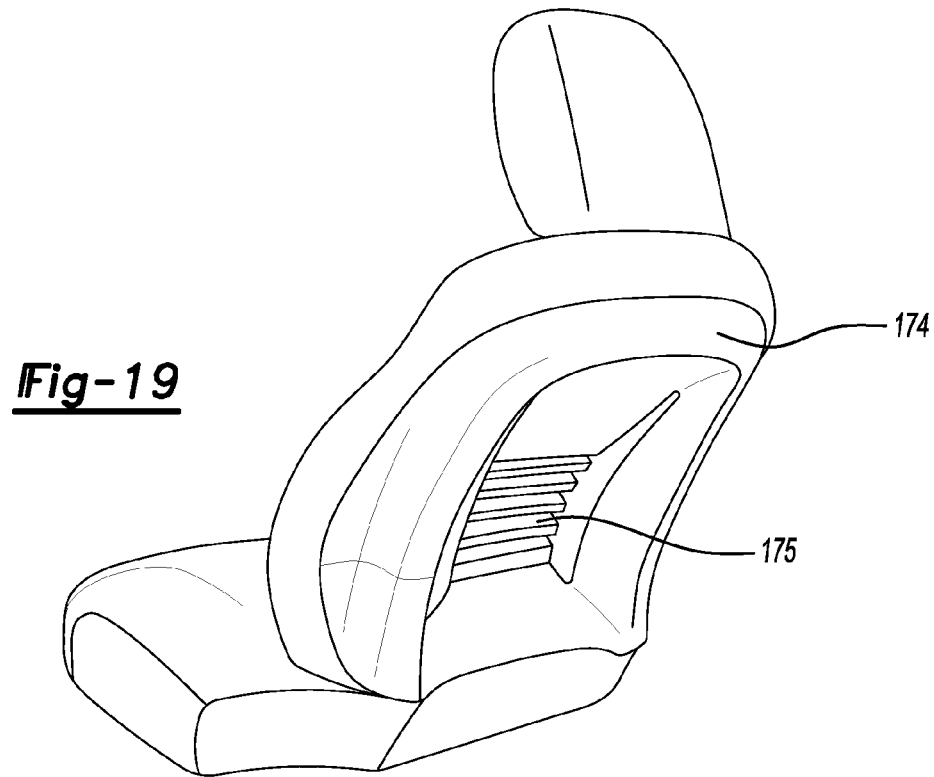
FIG. 19 is a perspective view from the rear side of a seat.

Another embodiment of a backpanel is shown in FIG. 18 including an interchangeable design. The backpanel shown generally at 170 includes a base 172 covering the majority of the rear surface of a backrest 14 having interchangeable inserts 174. The backpanel 170 and the inserts 174 are made of a closed-cell foam such as an EVA material. The backpanel 170 is provided with integrally formed attachment features, as described above, permitting the inserts to be assembled, disassembled and interchanged. The inserts 174 can be provided with many varying features to accommodate varying vehicle and occupant uses such as pockets or holders. In addition, the inserts 174 can be designed with varying looks on the exterior surface such as dimples, lines, or channels. The inserts 174 may also be provided with integrally formed features to enhance the occupant comfort. FIG. 19 shows an insert 174 having integrally formed hinges 175 to permit the insert to flex or pivot in response to the occupant use.

Figure 20:
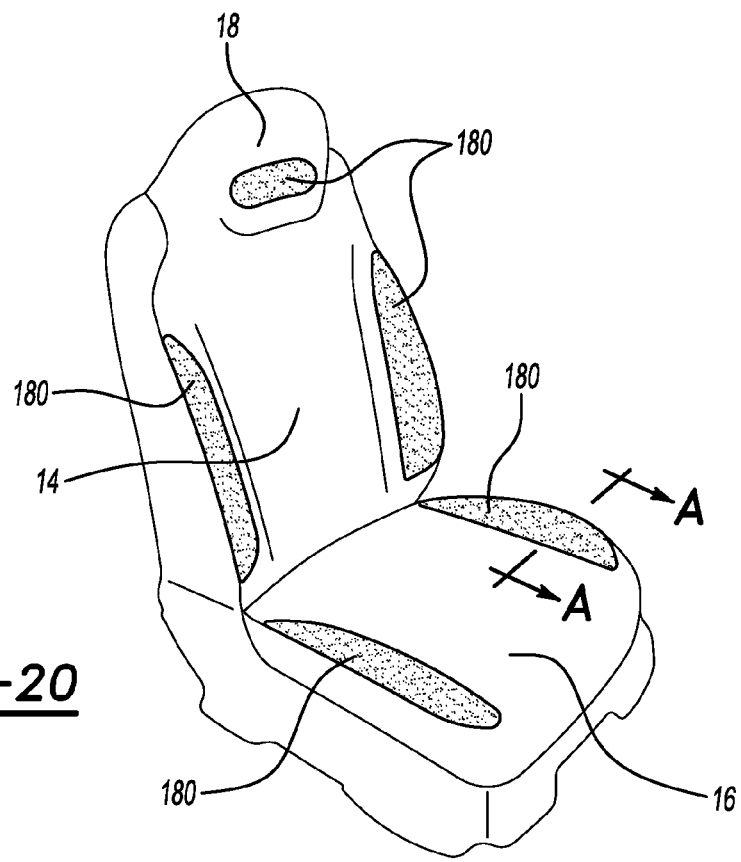
FIG. 20 is a perspective view of a seat.
Figure 21:
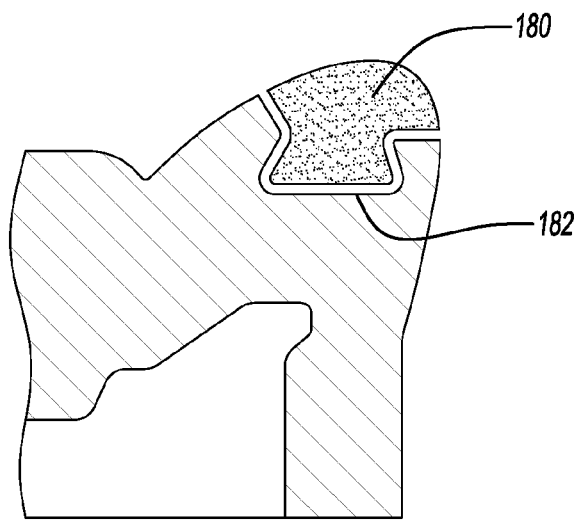
FIG. 21 is a partial sectional view of the seat in FIG. 20 taken along line A.

FIG. 20 shows a seat assembly 12 having a foam shell 40 with interchangeable wear inserts 180. The wears inserts 180 may be included in the backrest 14, the seat cushion 16 and/or the headrest 18. Similar to as described above, as shown in FIG. 21, the foam shell 40 includes pockets 182 formed integrally in the foam shell 40. The wear inserts 180 are also formed of closed-cell foam having a predetermined hardness and/or look. The wear inserts 180 can be inserted in to the pockets 182 to vary the look of the seat assembly or to increase the life of the overall seat assembly. For example, one seat assembly 12 having a foam shell 40 may be formed for use with more than one vehicle application, however, a certain wear insert 180 may be inserted into the pockets 182 of the foam shell 40 to give a differing look and/or durability to the seat assembly for that vehicle application. The wear inserts 180 may be designed with attachment features, as described above, or may be assembled into the pockets 182, as more fully described for assembling to seating components below.

Figure 22:
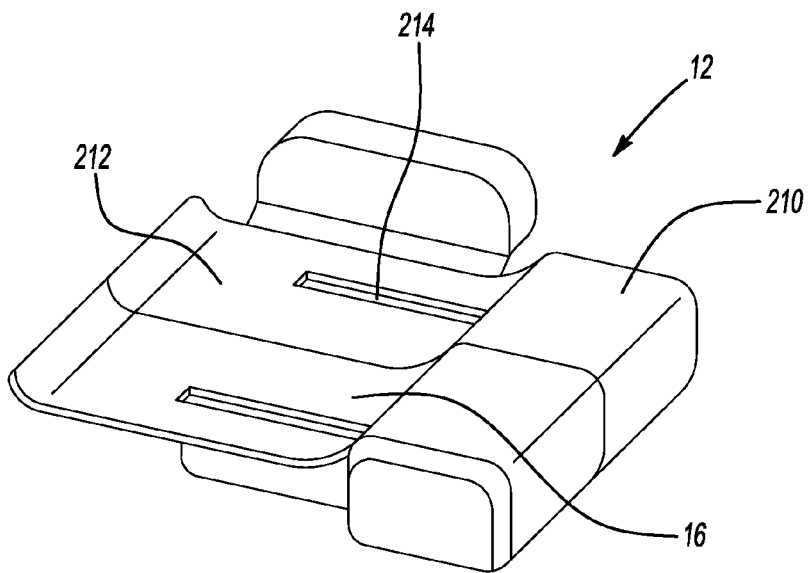
FIG. 22 is a partial assembly view of a seat.

FIG. 22 shows a seat assembly 12 having a foam shell 40 including an adjustable seat cushion 16. The seat cushion 16 includes a front bolster cushion 210 designed for adjustably mating with a cushion section 212. Both are formed from a closed-cell foam such as EVA material. The cushion section 212 includes a channel 214 permitting the bolster cushion 210 to be adjusted forward or backward depending on the amount of front bolster support desired. The front bolster cushion 210 includes attachment features formed integral therewith for sliding engagement with the channel 214.

Figure 23:
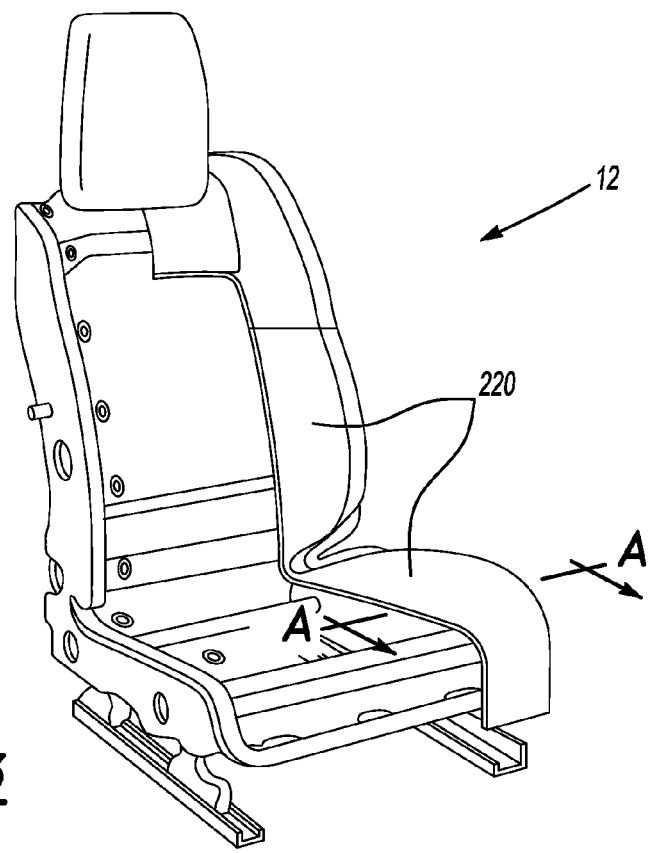
FIG. 23 is a perspective view of a seat.
Figure 24:
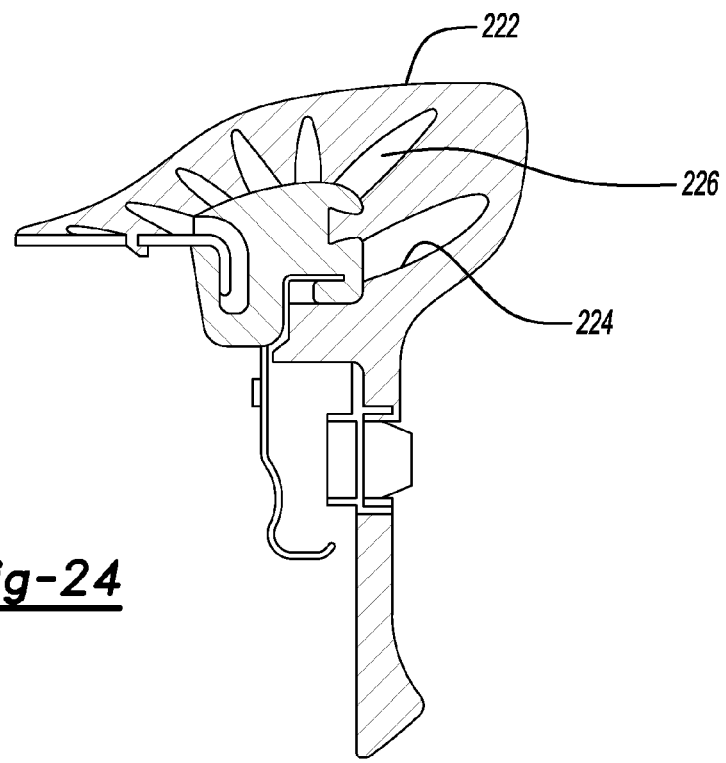
FIG. 24 is a partial sectional view of the seat in FIG. 23 taken along line A-A.

FIG. 23 shows a seat assembly 12 having at least a portion of the seat assembly made with a foam shell 40 from closed-cell foam. In this embodiment, the seat assembly is shown with foam shell bolsters 220 on both the backrest 14 and the seat cushion 16. FIG. 24 shows the foam shell bolsters in cross section. The foam shell bolsters 220 include a first surface 222 proximate the exterior surface and a second surface 224 adjacent to various frame-like structures. The second surface 224 includes at least one cavity 226 formed integral with the foam shell to provide a cushioning or dampening like feeling when the occupant depresses the first surface 222. The cavity 226 may be of any predetermined shape permitting the desired dampening effect to the occupant.

Figure 25:
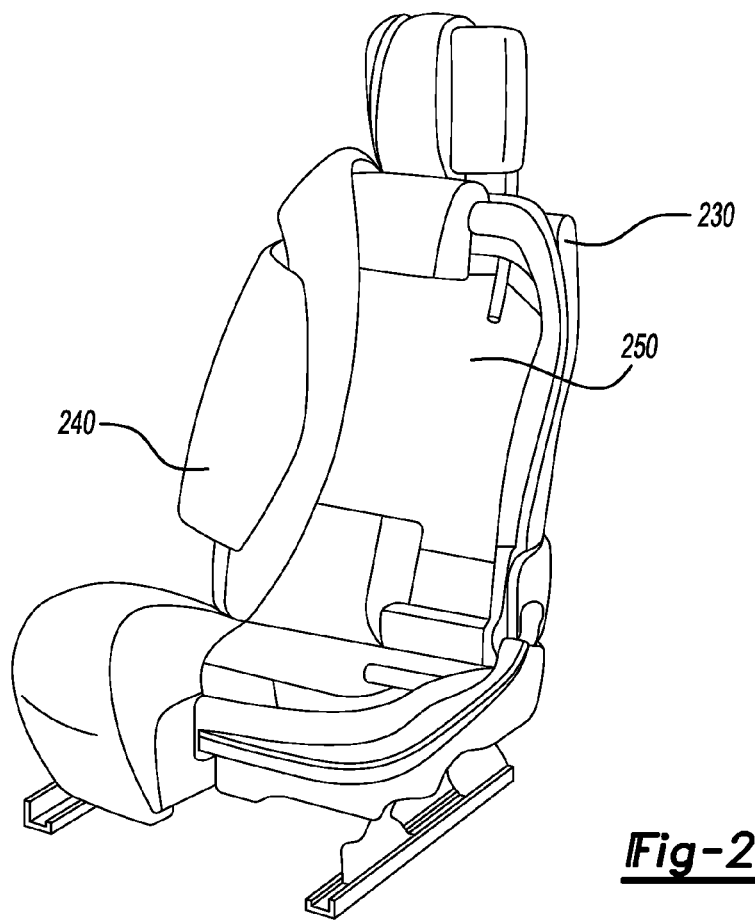
FIG. 25 is a partially assembled view of a seat.
Figure 26:
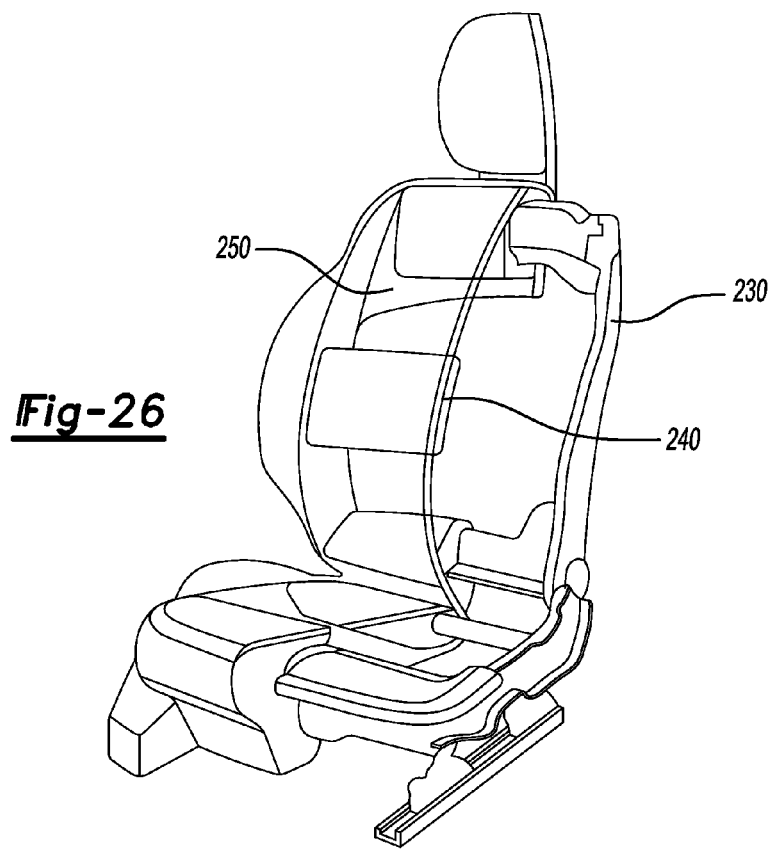
FIG. 26 is a partially assembled view of a seat.
Figure 27:
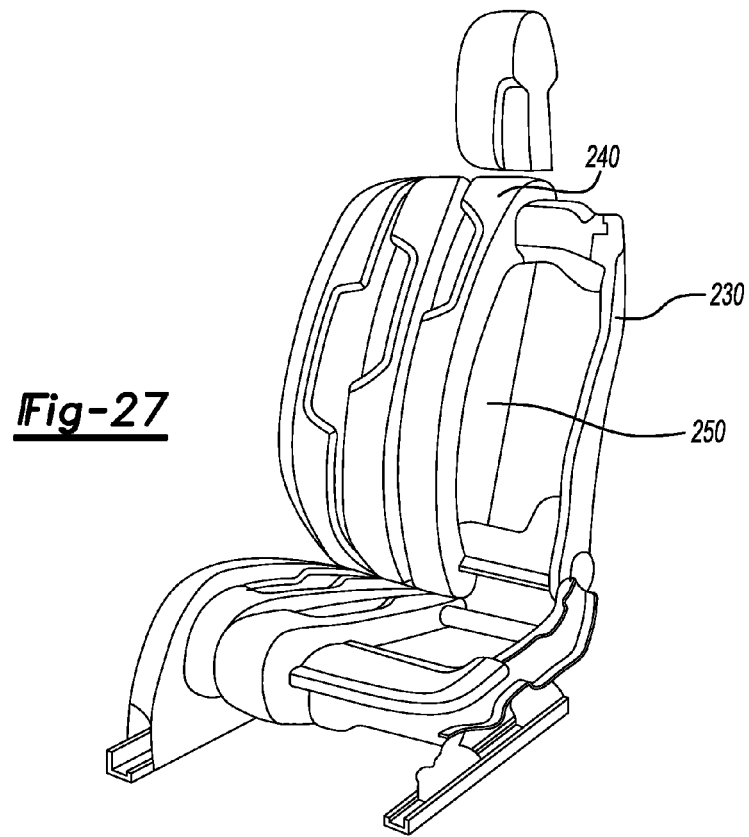
FIG. 27 is a partially assembled view of a seat.
Figure 28:
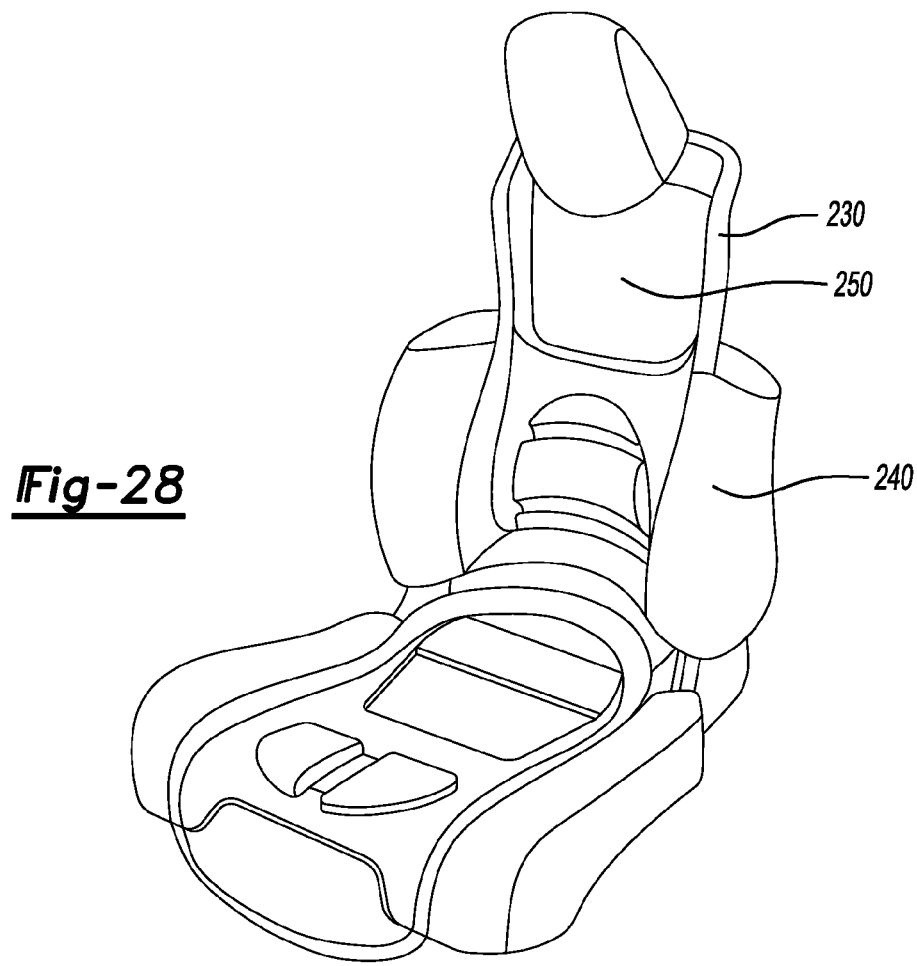
FIG. 28 is a partially assembled view of a seat.

FIGS. 25-29 show a seat assembly 12 having a backrest 14, seat cushion 16 and headrest 18. The seat assembly 12 in this embodiment is made of a frame-like structure 230, a foam shell 240 and a mesh carrier 250. The mesh carrier 250 is provided for additional support to an occupant and the foam shell 240 may be arranged for use with the mesh carrier. FIG. 25 shows the foam shell 240 as an exterior layer placed over the mesh carrier 250 in most locations. FIG. 26 shows the foam shell 240 used as an interior support to the mesh carrier 250 in the backrest 14 and seat cushion 16 portions of the seat assembly 12. FIGS. 27 and 28 show the foam shell 240 and the mesh carrier 250 used selectively as the exterior surface in predetermined locations of the seat assembly. The use of both the mesh carrier 250 and the foam shell 240 provides for a flexible manner of forming a seat assembly having predetermined properties while eliminating the costs associated with typical leather or leather-like trims and foam pads. Further, FIG. 28 shows the foam shell 240 being adjustable vertically about the frame-like structure 230.

Figure 29:
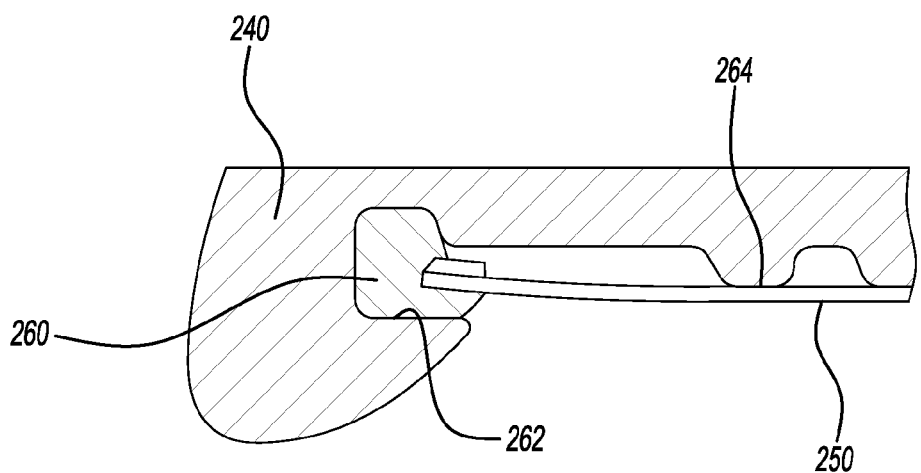
FIG. 29 is a partial sectional view of the seat of FIG. 28 taken along line A-A.
Figure 30:
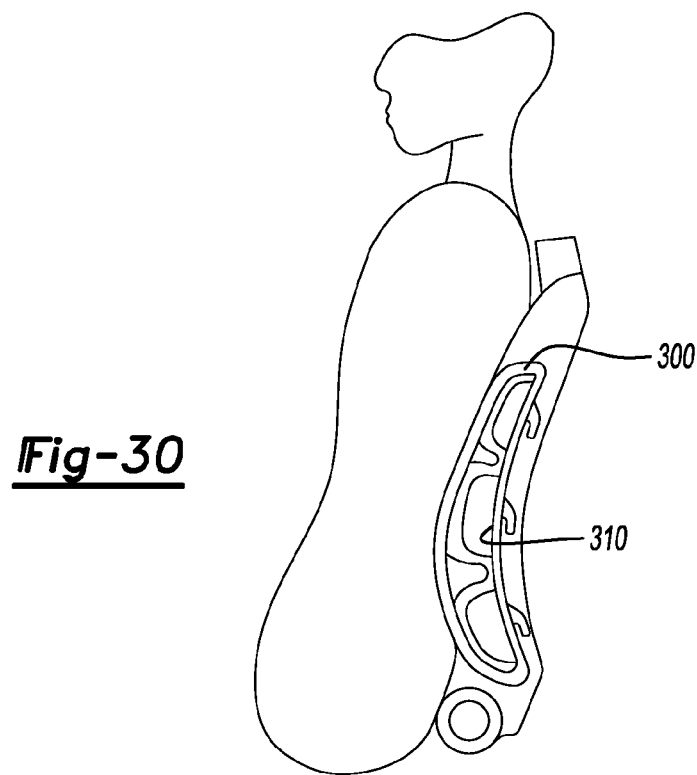
FIG. 30 is a side sectional view of a seat.
Figure 31:
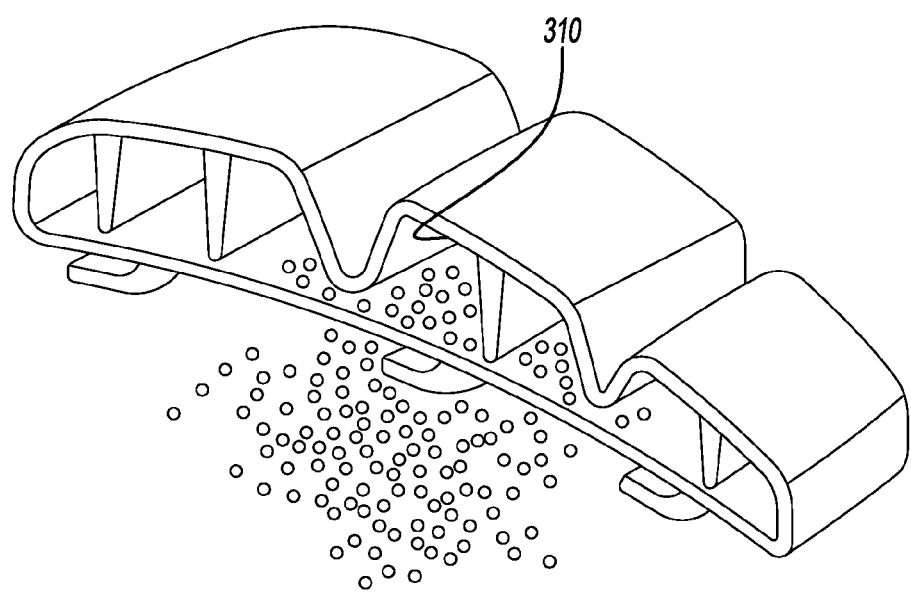
FIG. 31 is a partial sectioned view of a portion of the seat in FIG. 31.
Figure 32:
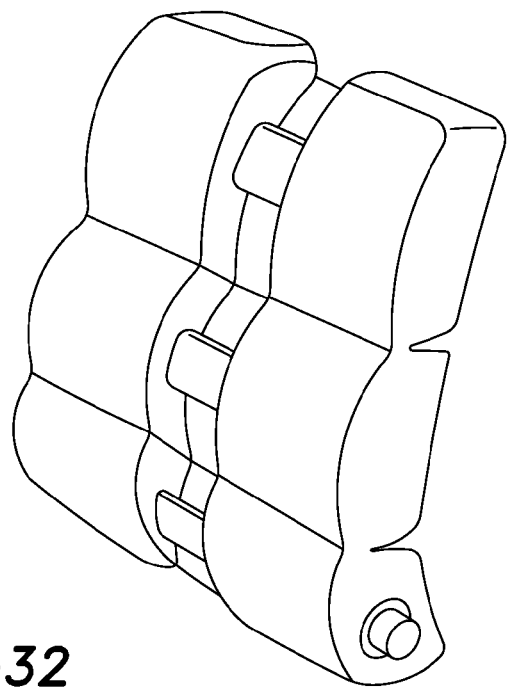
FIG. 32 is a partial sectioned view of another embodiment for a portion of the seat in FIG. 30.

FIG. 29 shows how the mesh carrier 250 and the foam shell 240 can be formed to assembly together. The mesh carrier can be insert molded with a foam carrier 260. The foam shell 240 includes an attachment feature, in this case, an integral channel 262 for receiving the foam carrier 260. The foam shell 240 may also provide additional support to the mesh carrier 250 such as by forming integral contact points 264 in select portions of the foam shell 240.

Figure 33:
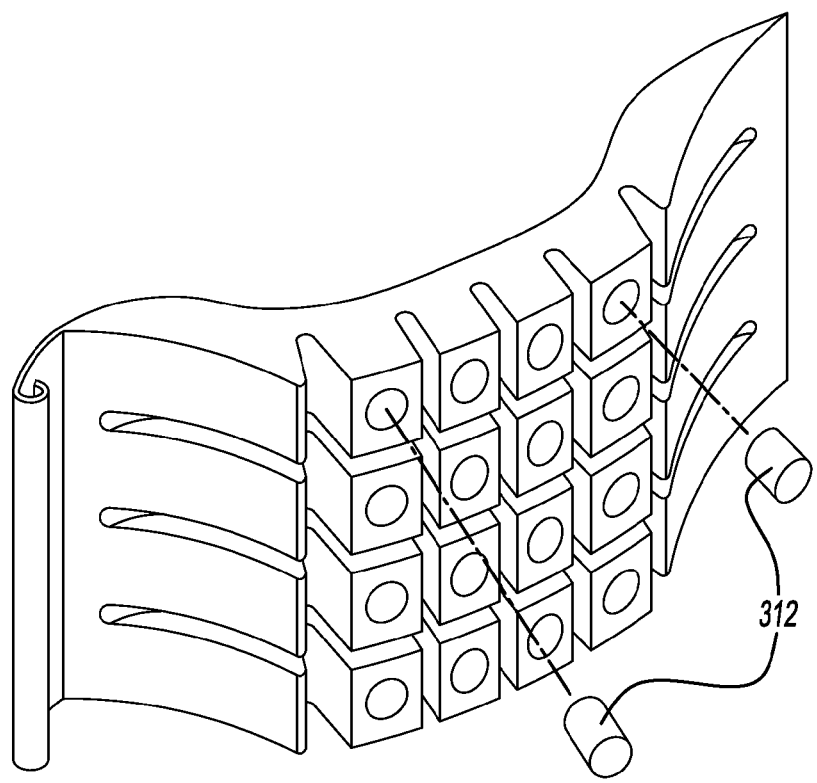
FIG. 33 is a perspective view of a portion of a seat.
Figure 34:
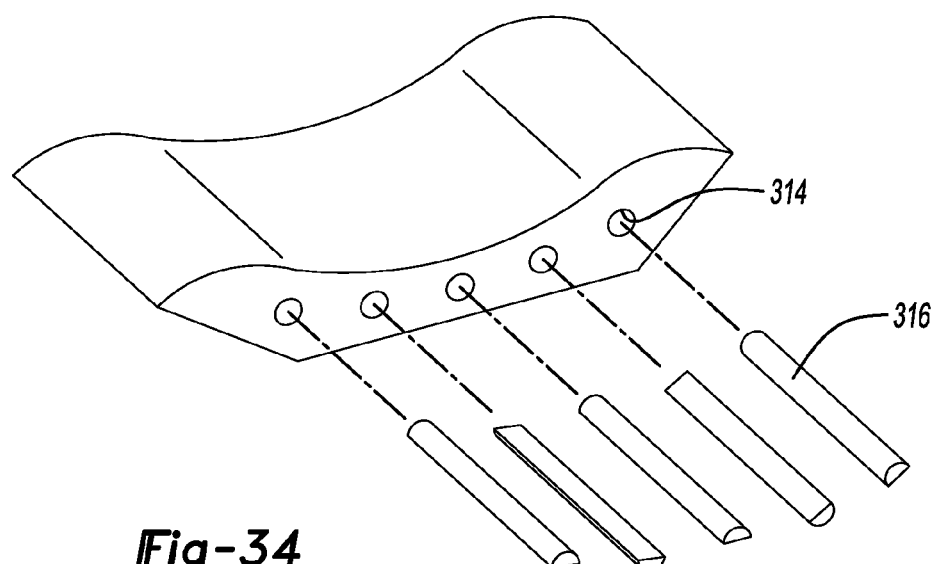
FIG. 34 is a perspective view of a portion of a seat.

FIGS. 30-56 show components made of a closed-cell foam for use in a seat assembly 12. FIGS. 30-34 show a lumbar support 300 made of closed-cell foam such as an EVA material. The lumbar support 300 is formed having at least one bladder 310. The bladder 310 provides varying support amounts to an occupant depending on the shape of the bladder and the media contained therein such as air or beads. FIG. 33 shows the bladder as a bore formed in the foam for receiving a plug 312. The plug 312 can be used to vary the feel of that portion of the seat assembly by using different materials or material hardnesses. Similarly, FIG. 34 shows an extruded section of a seat component made with closed-cell foam having apertures 314 for receiving plugs 316.

Figure 35:
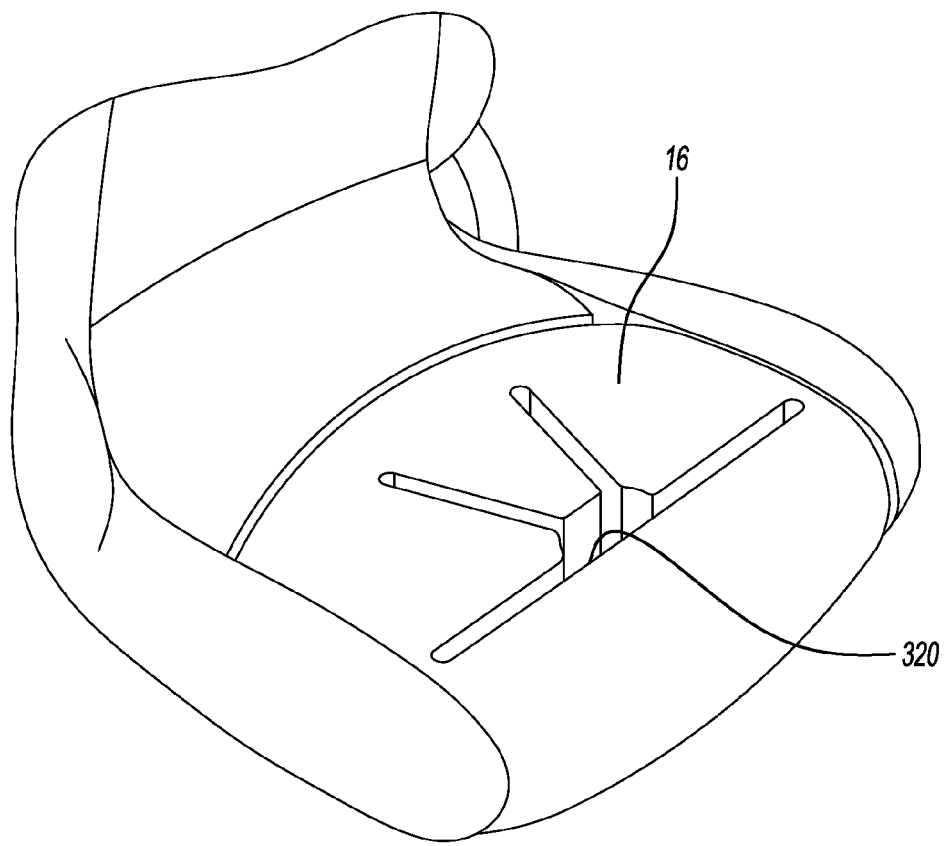
FIG. 35 is a perspective view of another embodiment of a seat.
Figure 36:
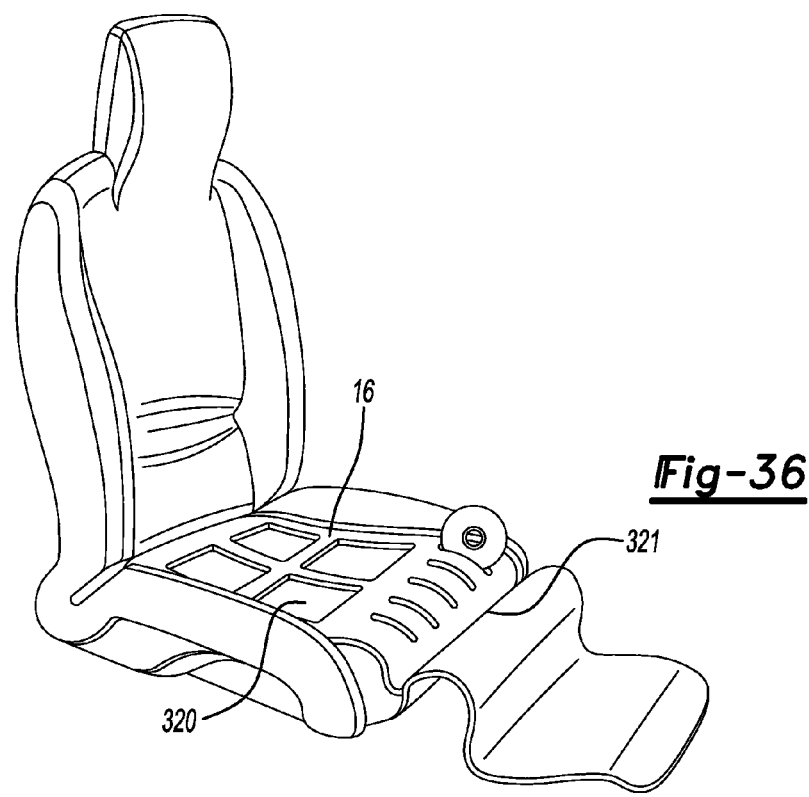
FIG. 36 is a perspective view of another embodiment of a seat.

FIGS. 35 and 36 show a component of a closed-cell foam component of a seat assembly wherein at least a portion of the component is formed having an integral channel 320 to receive debris or spills. In FIG. 36, the channel 320 is formed on the seat cushion 16 of the seat assembly wherein the seat cushion 16 includes an integral hinge 321 formed in the foam component permitting at least a portion of the seat cushion 16 to be selectively covered and uncovered.

Figure 37:
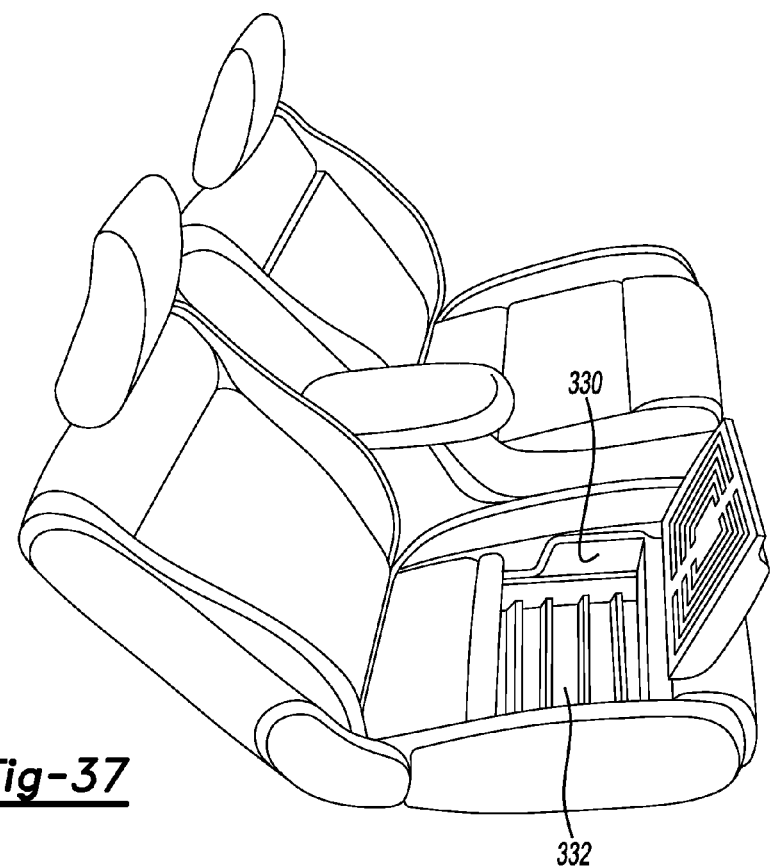
FIG. 37 is a perspective view of another embodiment of a seat.
Figure 38:
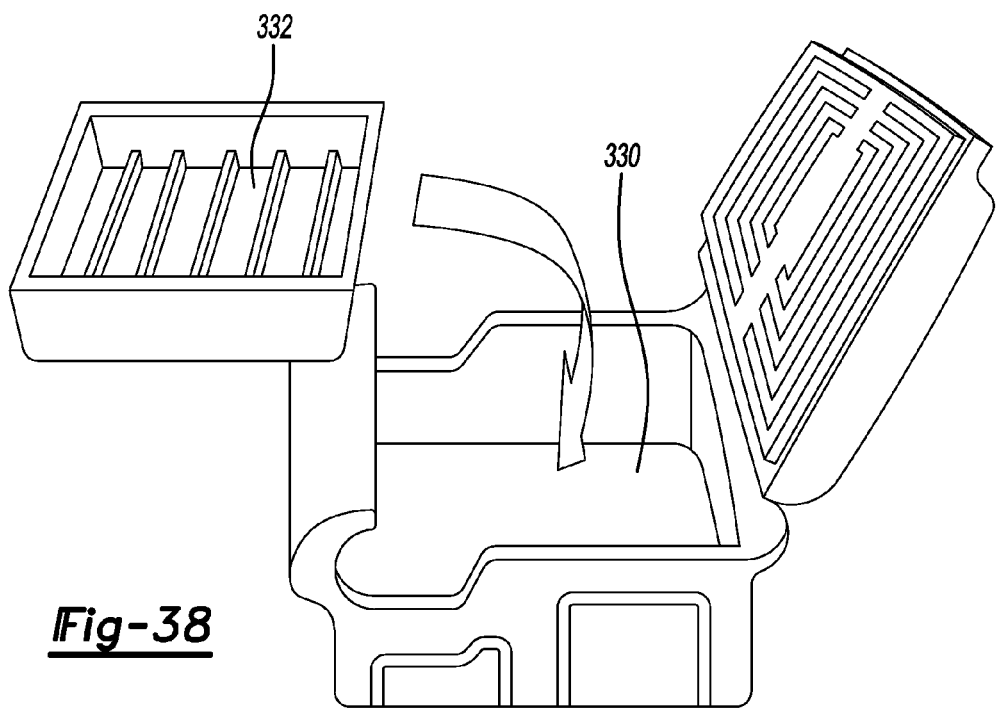
FIG. 38 is a perspective view of a portion of the seat in FIG. 39.

FIGS. 37 and 38 show a component of a closed-cell foam component of a seat assembly wherein the seat cushion 16 is formed from closed-cell foam with a compartment 330 including a removable tray 332.

Figure 39:
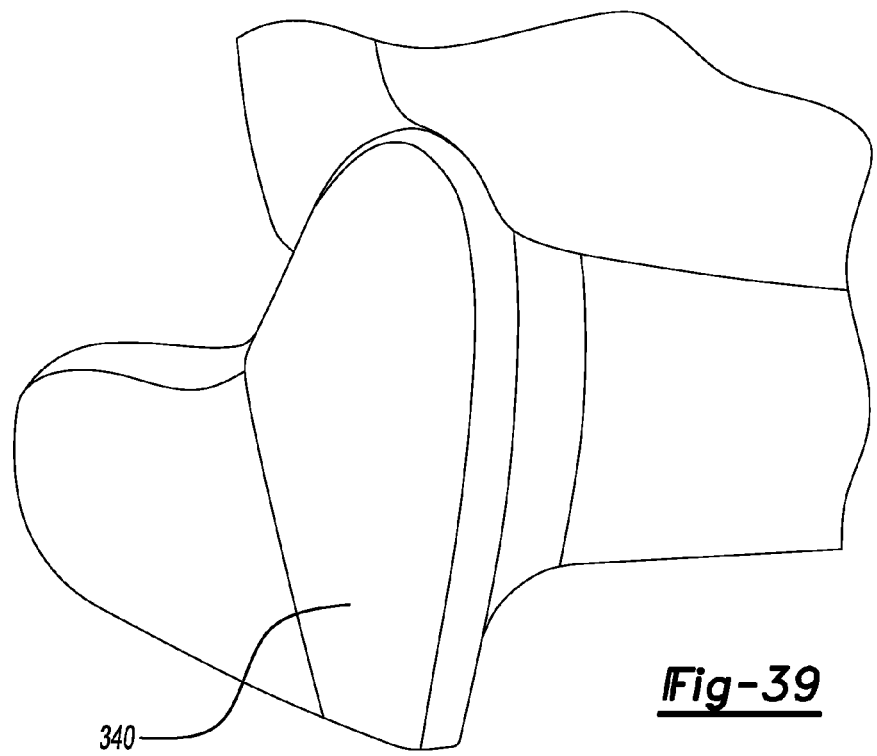
FIG. 39 is a perspective view of a seat component.
Figure 40:
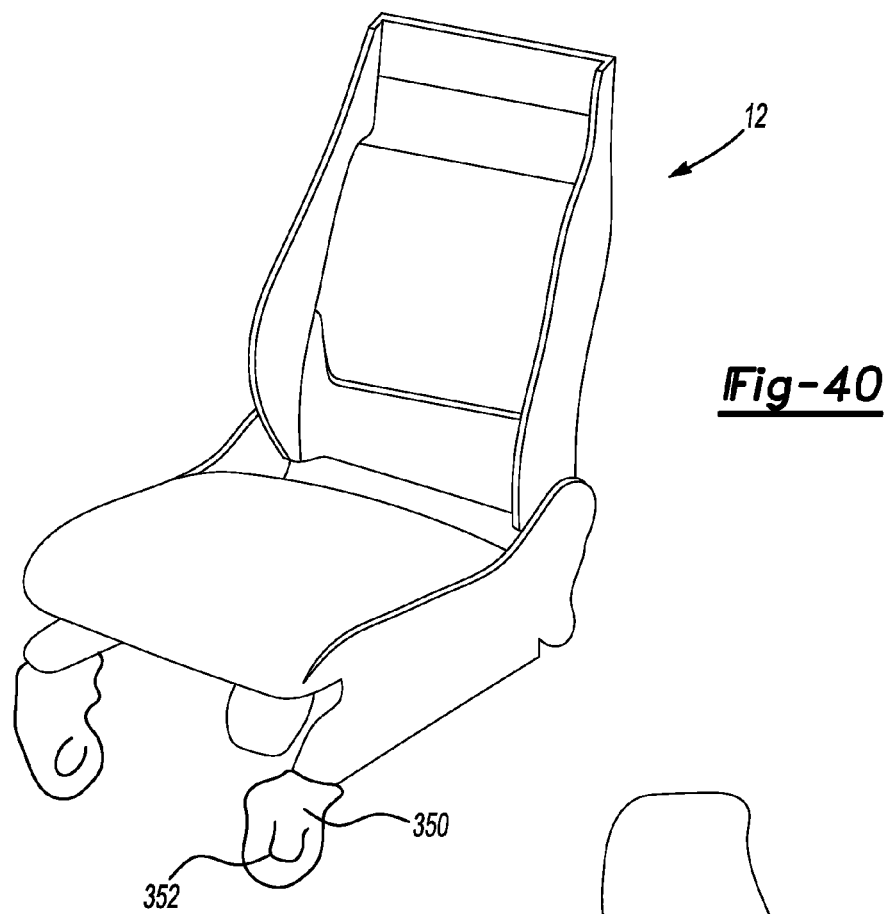
FIG. 40 is a perspective view of a partially assembled seat.

FIGS. 39 and 40 show a component of a seat assembly made with a closed-cell foam. FIG. 39 shows a corner of a seat assembly having a cover trim panel made of closed-cell foam covering a recliner mechanism. Most recliner covers are made of hard plastic material making assembly difficult and causing squeak and rattle issues in the vehicle. In this embodiment, the recliner mechanism (not shown) is covered with a foam trim panel 340 made of closed-cell foam. As described above, the trim panel 340 can be formed integral with attachment features for mating with adjacent seat component. Similarly, FIG. 40 shows a seat assembly 12 having at least a portion of the seat track or support pedestals covered with a trim panel 350 made of closed-cell foam. The trim panel 350 includes an access flap 352 formed integral with the trim panel 350 permitting access to the seat track or pedestal.

Figure 41:
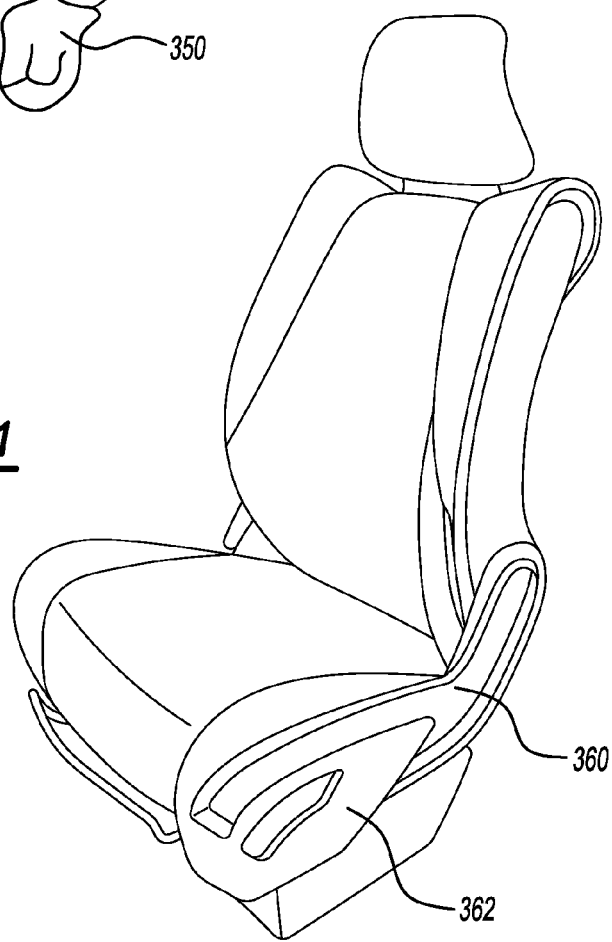
FIG. 41 is a perspective view of a seat component.

FIG. 41 shows a component of a seat assembly made with a closed-cell foam. The seat assembly 12 includes a side panel 360 having an integrally formed pocket 362. The side panel 360 and the pocket 362 are formed of a closed-cell foam such as an EVA material. Further, in this embodiment, the side panel 360 is formed to extend up along at least a portion of the backrest to also cover the recliner mechanism. Since the side panel 360 is formed of closed-cell foam, it can be formed to cover at least a portion of both the backrest 14 and the seat cushion 16 without concerns over squeaks or rattles.

Figure 42:
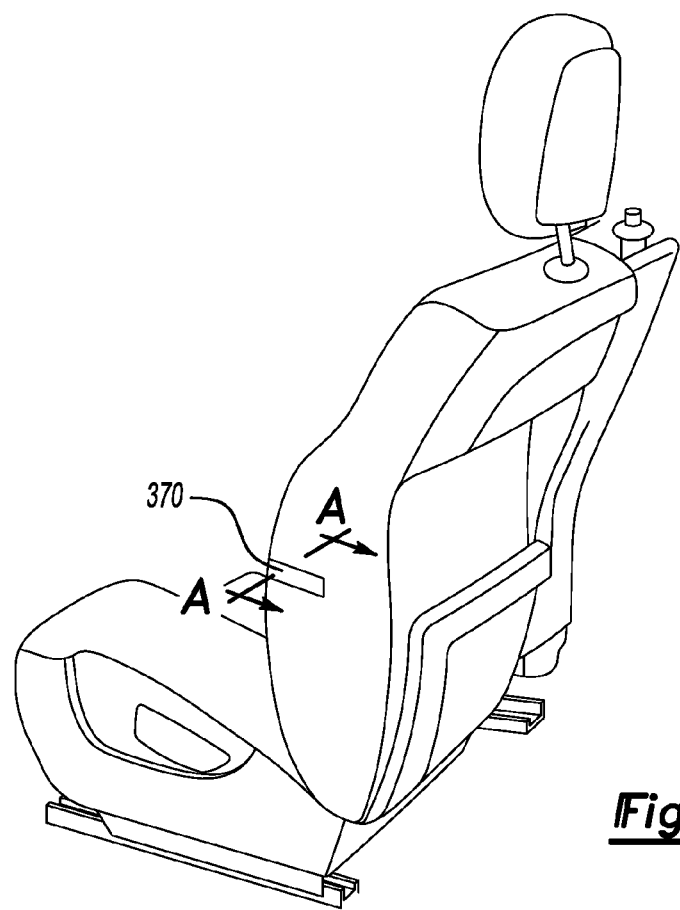
FIG. 42 is a perspective view of a seat.
Figure 43:
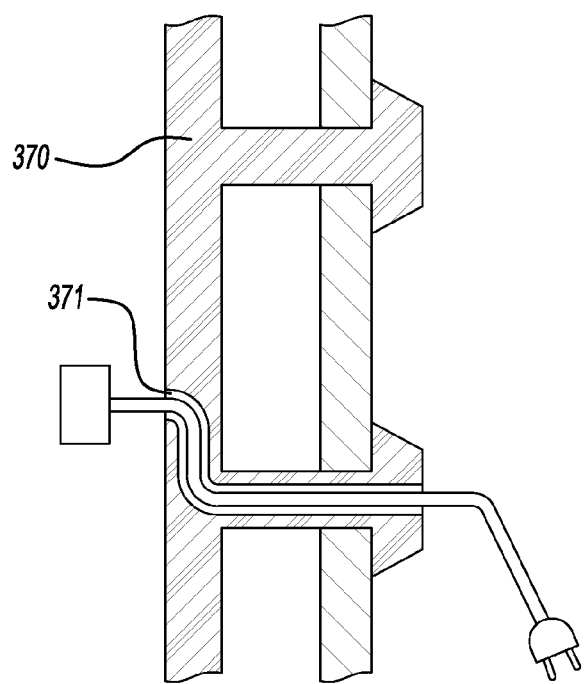
FIG. 43 is a partial sectional view of a portion of the seat in FIG. 44 taken along line A-A.

FIGS. 42 and 43 show a component of a seat assembly made with closed-cell foam. The seat assembly 12 includes an electrical outlet cover 370 formed from closed-cell foam. The cover 370 is provided for use with a foam shell 40 or with conventional seat materials. The cover 370 includes at least one integral aperture 371 for receiving either of an electrical plug or wiring. The cover 370 includes attachment retention features permitting the cover 370 to be assembled to another seat component. As more fully described herein, the cover 370 can be assembled with another seat component after removal from a mold, but before cooling is permitted. After the cover 370 is assembled to the component and cool, the closed-cell foam of the cover 370 will expand and lock the cover 370 to the component.

Figure 44:
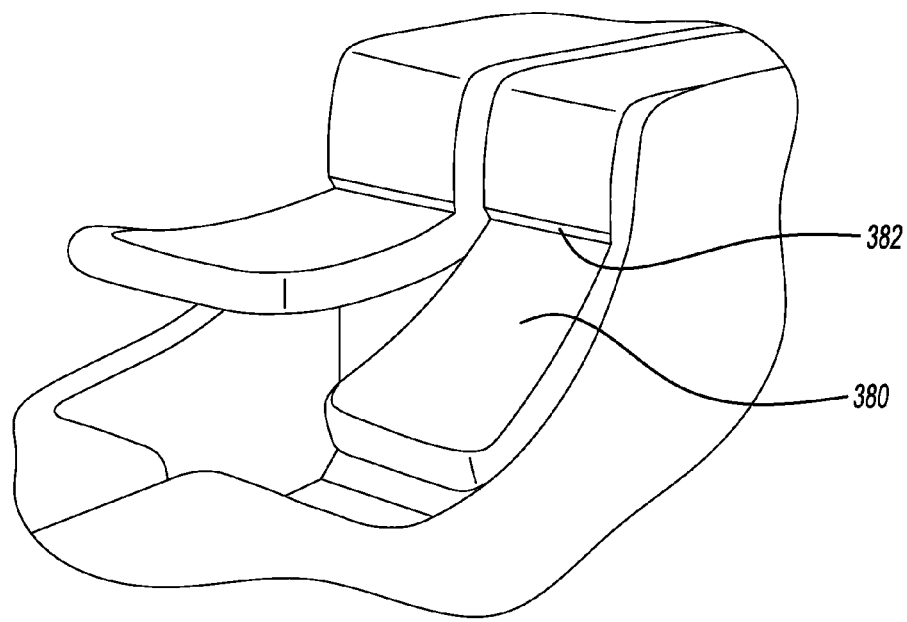
FIG. 44 is a perspective view of a seat component.
Figure 45:
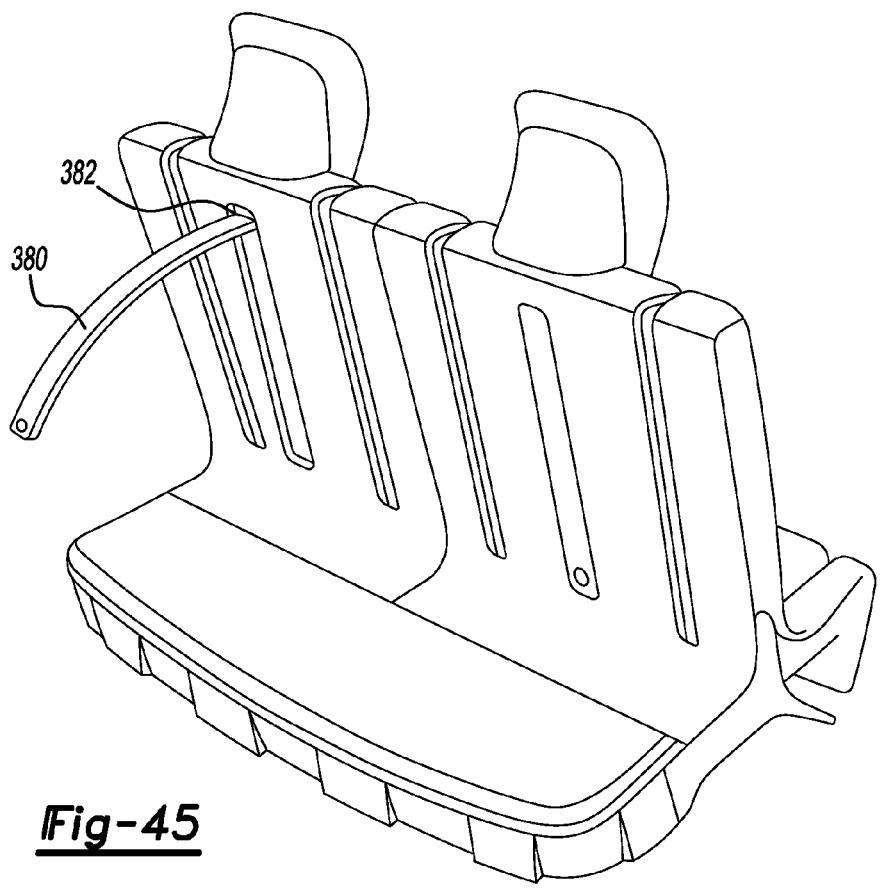
FIG. 45 is a perspective view of a seat component.

FIGS. 44 and 45 show a lever-type handle made of closed-cell foam for use with a seat assembly 12. The lever-type handle 380 is formed integral with the closed-cell foam from another component of the seat assembly. For example, FIG. 45 shows a backpanel formed from closed-cell foam having an integral hinge 382 formed therein along with the handle 380. The handle 380 can be positioned and formed at any needed location in the seat assembly.

Figure 46:
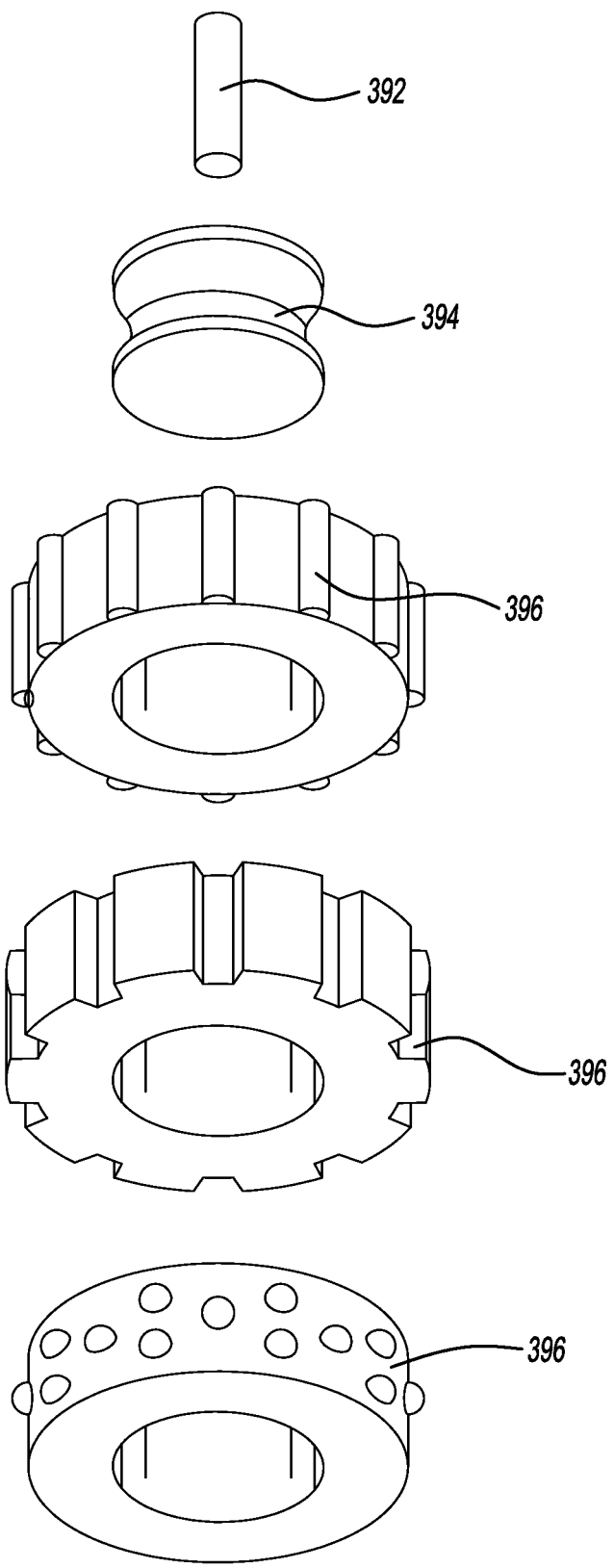
FIG. 46 is an assembly view of a seat component.

FIGS. 46 and 47 show a knob-type handle made of closed-cell foam for use with a seat assembly 12. FIG. 46 shows a typical knob for use for example with a recliner mechanism. In this embodiment, the knob 390 includes a shaft 392, hub 394 and handle 396. The handle 396 is formed of closed-cell foam material in the method as disclosed herein and may have any number of features integrally formed on the outer surface to improve grip. More specifically, after forming the handle 396, but before cooling of the handle 396 to a certain temperature, the handle 396 is positioned in the hub 394 and permitted to cool thereby locking the handle 396 to the hub 394. FIG. 47 shows a similar embodiment of a handle made with closed-cell foam, however, in this embodiment, the handle 410 is a bar-type handle used for forward and backward motion of the seat assembly wherein the handle includes a metal rod having a closed-cell foam handle 410 formed thereon.

FIGS. 48 and 49 show an armrest 420 of a seat assembly 12 made from a closed-cell foam. The armrest 420 includes a closed-cell foam component 422 formed over an armature 424. As similarly described herein, the armrest foam component 422 is formed and removed from the mold, before permitting the component to cool to a certain temperature, the armature 424 is inserted into at least a portion of the foam component 422, such as a channel 426, the component is cooled and shrinks in size to the armature thereby locking the foam component 422 to the armature 424.

Figure 50:
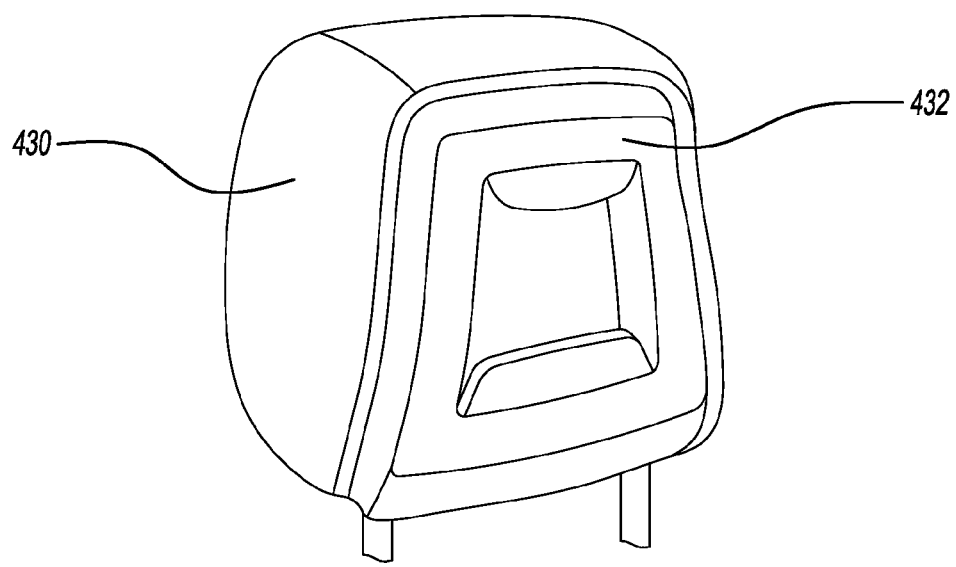
FIG. 50 is a perspective view of a head rest for a seat.
Figure 51:
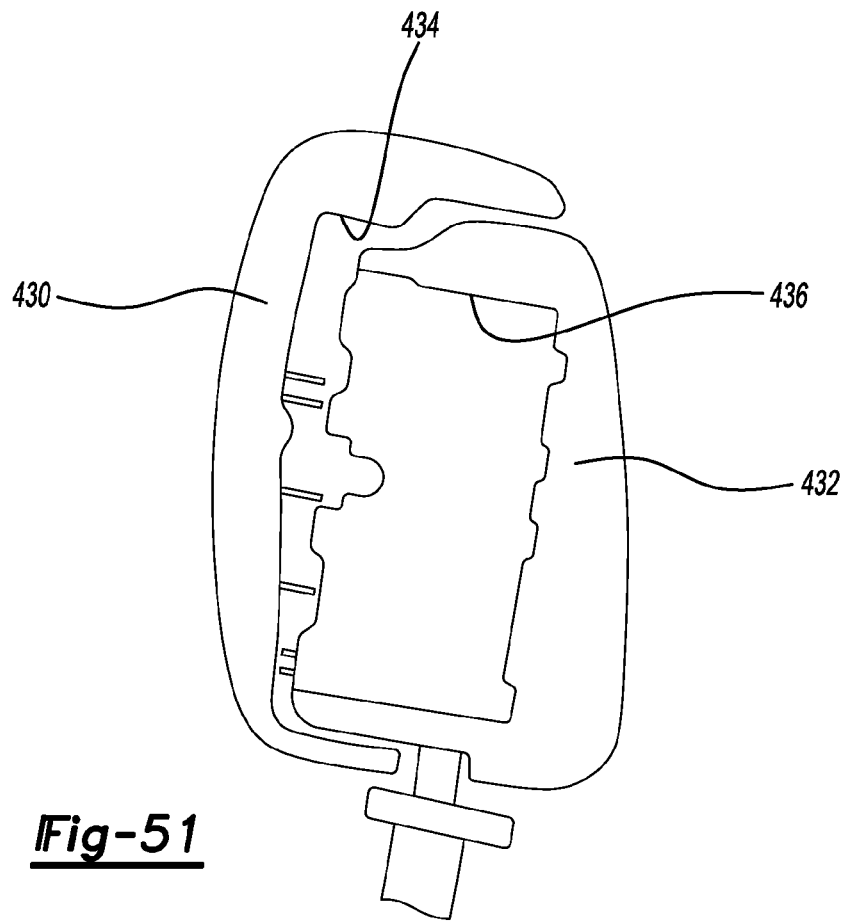
FIG. 51 is a side sectional view of the head rest of FIG. 53.
Figure 52:
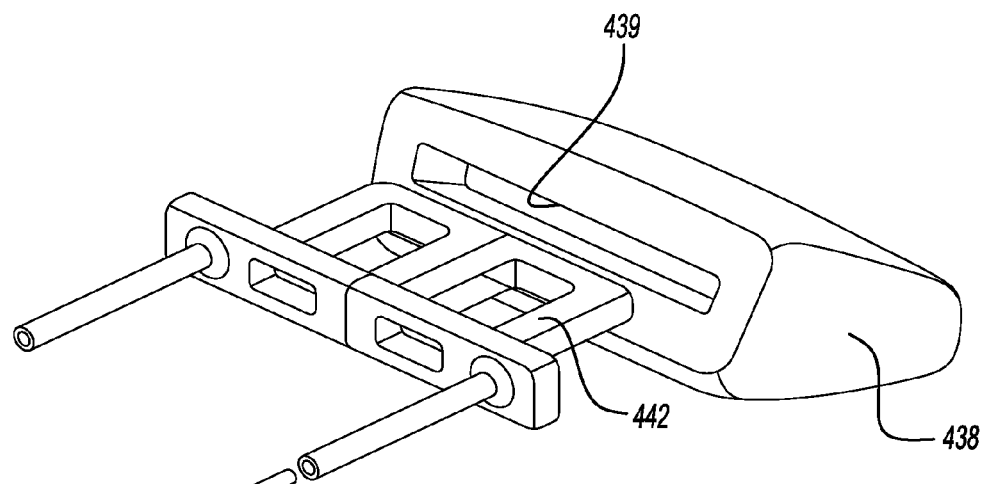
FIG. 52 is a partial assembly view of a head rest for a seat.
Figure 53:
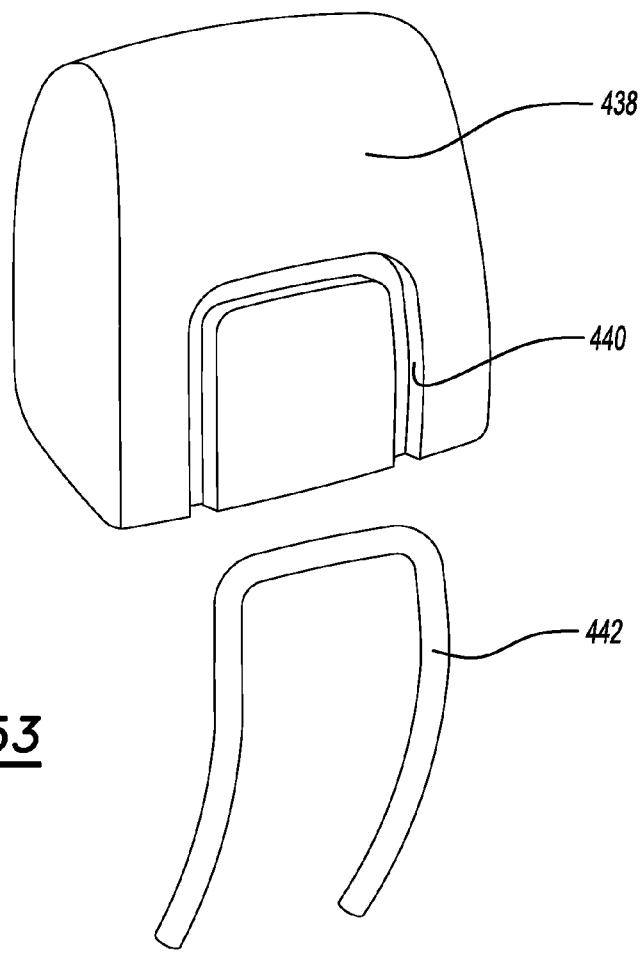
FIG. 53 is a partial assembly view of a head rest for a seat.

FIGS. 50-53 show a headrest component 18 made at least partially with closed-cell foam material such as an EVA. The embodiment shown in FIGS. 50 and 51 show a headrest 18 having a two-piece head rest cover made of closed-cell foam including a front and a rear panel, 430 and 432, respectively. Both panels, 430 and 432 are formed over plastic substrates 434 and 436 by use of the method disclosed herein wherein during the forming process of each panel, cooling after forming is used to mate the panel to its respective substrate. FIGS. 52 and 53 show a headrest 18 having a cushion portion 438 having either an aperture 439 or channel 440 integrally formed in the cushion portion 438 for receiving a rod 442. The cushion portion 438 is mated with the rod 442 by use of the method disclosed herein.

FIG. 54 shows a bolster component 450 made of closed-cell foam for use with a seat assembly. More specifically, in this embodiment the bolster component 450 is assembled to a frame-like portion 452 of the backrest 14 by use of the method disclosed herein wherein during the process of forming each bolster component 450 from closed-cell foam, cooling after forming is used to mate the bolster component 450 to the frame-like portion 452.

FIGS. 55 and 56 show a seat assembly made with a closed-cell foam. It should be appreciated that the foam shell 40 of the seat assembly can be formed having an integral surface texture. In this embodiment the foam shell surface texture is shown having an acupuncture type texture, however, it should be appreciated that many types of surface textures can be formed integral with the surface of the foam shell 40.

Figure 57:
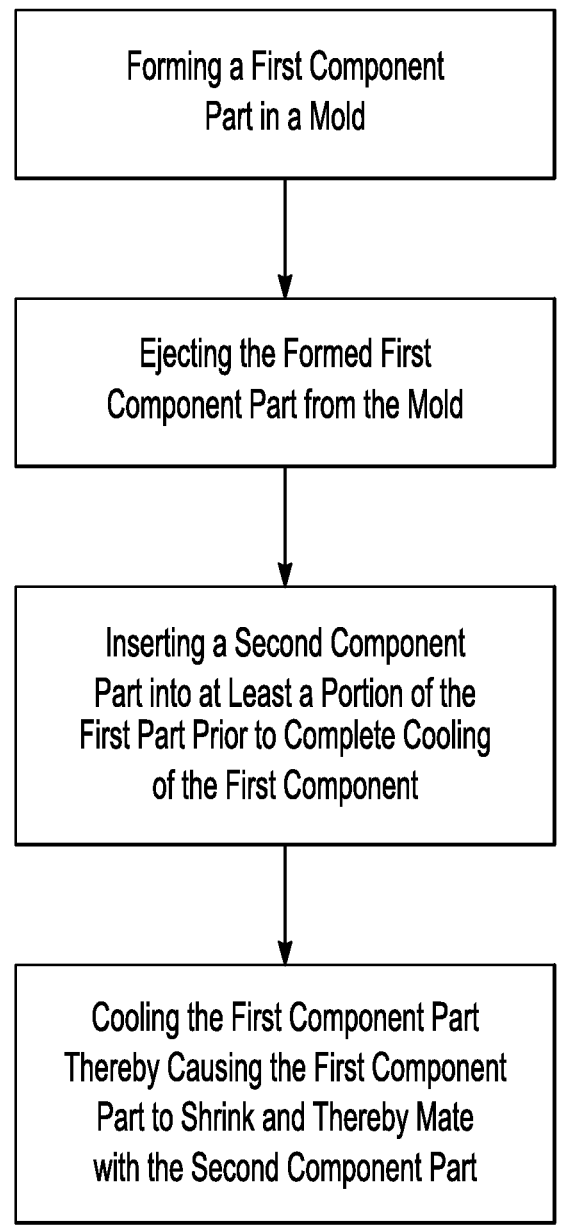
FIG. 57 is a block diagram for assembling at least a portion of a seat.

FIG. 57 shows a block diagram of the method of forming a seat assembly with a first component and a second component. A first component is formed from a closed-cell foam in a mold The first component is ejected from the mold and a second component is inserted into at least a portion of the first component prior to the first component reaching a predetermined temperature. The first component having the second component inserted therein is permitted to cool below the predetermined temperature thereby causing the first component to shrink in size and lock or mate with the second component. The closed cell, self-skinning parts are self-ejecting and are approximately 10% larger than in their design size (i.e., than when cooled). When the EVA is in its "swelled" state immediately post-molding, it may be easily married to one or more components, thus creating a mechanical lock when later cooled to its design size.

Figure 58:
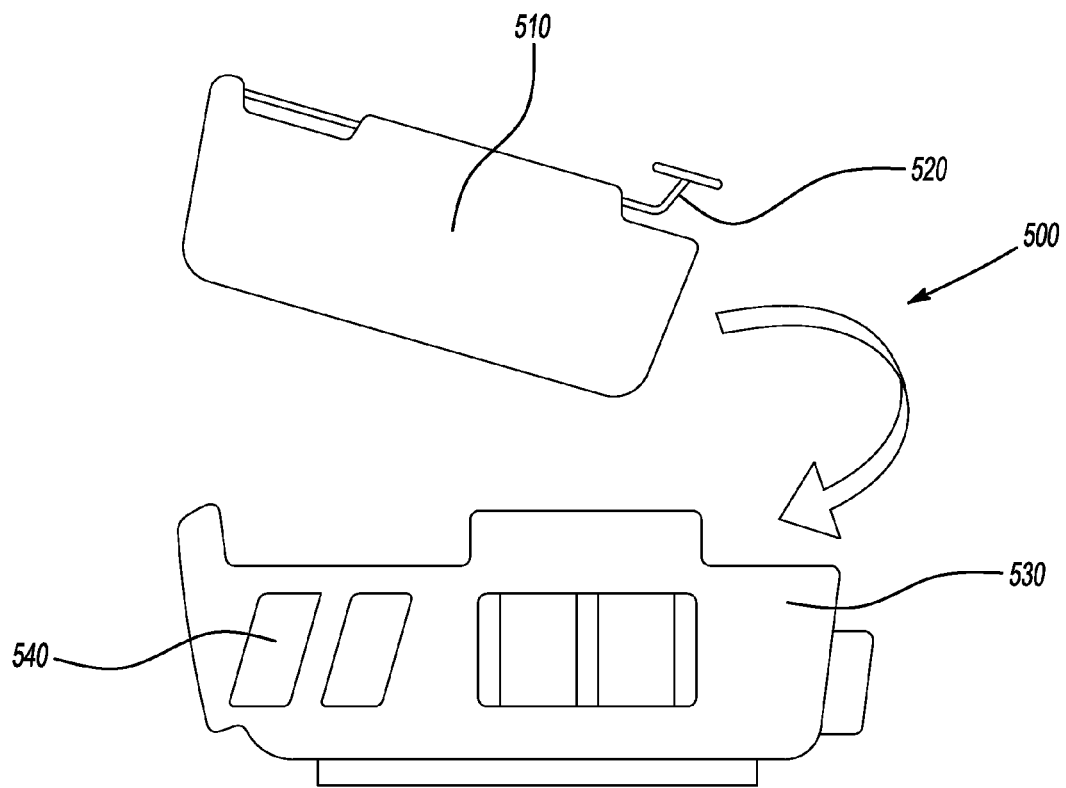
FIG. 58 is partial assembly view of a visor.
Figure 59:
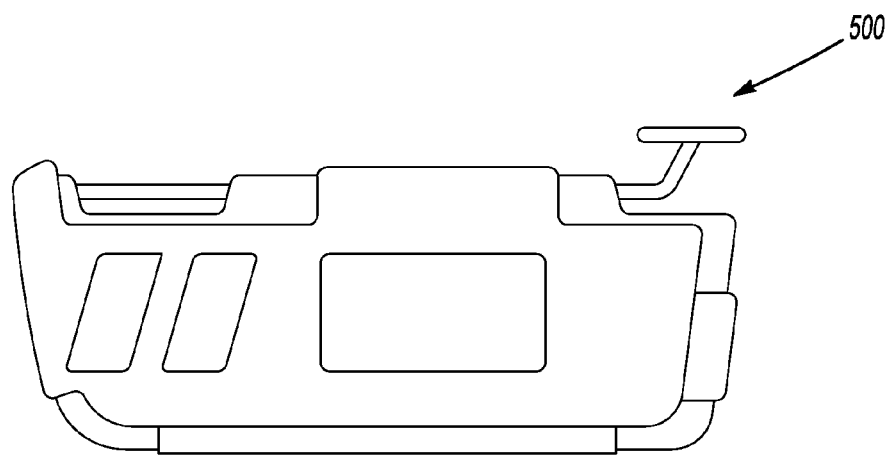
FIG. 59 is a side view of the visor of FIG. 58.

FIGS. 58 and 59 show a sunvisor for a vehicle made using the method disclosed herein. The sunvisor shown generally at 500 includes a visor 510, an attachment rod 520 and a foam shell 530 made of closed-cell foam. The foam shell 530 includes at least one pocket-like portion 540 for holding articles. The foam sunvisor 500 is formed using the method disclosed herein.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A seat assembly comprising:
   a seat cushion coupled to a seat cushion frame assembly;
   a backrest coupled to a backrest frame assembly;
   a molded foam shell configured to be assembled after molding to one of said seat cushion frame assembly and said backrest frame assembly; and
   wherein said molded foam shell is formed from a closed-cell foam and having an integral exterior surface for use as one of said seat cushion and said backrest and wherein said foam shell includes attachment features formed as one piece with said foam shell and extending outwardly from a surface facing opposite a portion of said integral exterior surface, wherein said portion of said integral exterior surface is adapted for engaging a sitting occupant and wherein said attachment features provide a retention mechanism for slidably engaging and attaching said foam shell to at least one of said seat cushion frame assembly and said backrest frame assembly, and wherein said molded foam shell is detachable via said attachment features from said at least one of said seat cushion frame assembly and said backrest frame assembly and wherein said attachment features are loops, channels, and hooks.

2. A seat assembly of claim 1 wherein said foam shell is defined to cover at least a portion of both of said seat cushion and said backrest.

3. A seat assembly of claim 1 wherein the seat assembly includes a headrest and said foam shell is defined to cover at least a portion of said headrest.

4. A seat assembly of claim 3 wherein said foam shell is defined to cover at least a portion of all of said seat cushion, a bracket and said headrest.

5. A seat assembly of claim 1, wherein said foam shell includes a predetermined hardness.

6. A seat assembly of claim 1 wherein said backrest includes a channel retaining said foam shell on said backrest.

7. A seat assembly of claim 1 wherein said seat cushion includes a channel retaining said foam shell on said seat cushion.

8. A seat assembly of claim 1 wherein at least one of said seat cushion frame assembly and said backrest assembly includes said attachment features having at least one of mating male and female features.

9. A seat assembly of claim 1 wherein said foam shell is configured for use as said seat cushion and said attachment features are formed integral with said seat cushion for attaching said foam shell to said seat cushion frame assembly.

10. A seat assembly of claim 1 wherein said foam shell is configured for use as said backrest and said attachment features are formed integral with said backrest for attaching said foam shell to said backrest frame assembly.

11. A seat assembly of claim 1 wherein said foam shell includes a textured surface.

12. A seat assembly of claim 1 wherein said foam shell is disposed to cover at least a portion of another component attached to one of said seat cushion and said backrest.

13. A seat assembly of claim 12 wherein said component is a recliner mechanism.

14. A seat assembly of claim 12 wherein said component is one of said seat cushion frame assembly and said backrest assembly.

15. A seat assembly comprising:
a seat cushion coupled to a seat cushion frame assembly;
a backrest coupled to a backrest frame assembly; and
a foam shell being formed from a closed-cell foam and having an integral exterior surface for use as one of said seat cushion and said backrest and wherein said foam shell includes attachment features formed as one piece with said foam shell and extending outwardly from a surface facing opposite a portion of said integral exterior surface, wherein said portion of said integral exterior surface is adapted for engaging a sitting occupant, and wherein said attachment features are configured to attach said foam shell to at least one of said seat cushion frame assembly and said backrest frame assembly, and wherein said attachment features are loops, channels, and hooks for slidably engaging and attaching at least one of said seat cushion and said backrest to said at least one of said seat cushion frame assembly and said backrest frame assembly.

16. A seat assembly comprising:
a seat cushion coupled to a seat cushion frame assembly;
a backrest coupled to a backrest frame assembly;
a molded foam shell configured to be assembled after molding to one of said seat cushion frame assembly and said backrest frame assembly; and
wherein said molded foam shell is formed from a closed-cell foam and having an integral exterior surface for use as one of said seat cushion and said backrest and wherein said foam shell includes attachment features formed as one piece with said foam shell and located on a surface disposed opposite a portion of said integral exterior surface, wherein said portion of said integral exterior surface is adapted for engaging a sitting occupant and wherein said attachment features are configured to attach said foam shell to at least one of said seat cushion frame assembly and said backrest frame assembly, and wherein said molded foam shell is detachable via said attachment features from said at least one of said seat cushion frame assembly and said backrest frame assembly, and wherein said attachment features are loops, channels, and hooks, and wherein said loops have a first end and a second end extending outwardly from said surface disposed opposite said portion of said integral exterior surface forming a closed u-shape with said surface disposed opposite said portion of said integral exterior surface, wherein said channels have a general u-shape opening rearwardly from said surface disposed opposite said portion of said integral exterior surface, and hooks extend outwardly from said surface disposed opposite said portion of said integral exterior surface, and one opening upwardly and one opening downwardly forming at least one of a generally U-shape and V-shape with said integral exterior surface, and wherein said loops, channels, and hooks provide a retention mechanism for slidably engaging and attaching at least one of said seat cushion and said backrest to said at least one of said seat cushion frame assembly and said backrest frame assembly.

17. A seat assembly comprising:
a seat cushion coupled to a seat cushion frame assembly;
a backrest coupled to a backrest frame assembly;
a molded foam shell configured to be assembled after molding to one of said seat cushion frame assembly and said backrest frame assembly; and
wherein said molded foam shell is formed from a closed-cell foam and having an integral exterior surface for use as one of said seat cushion and said backrest and wherein said foam shell includes attachment features formed as one piece with said foam shell and located on a surface disposed opposite a portion of said integral exterior surface, wherein said portion of said integral exterior surface is adapted for engaging a sitting occupant and wherein said attachment features are configured to attach said foam shell to at least one of said seat cushion frame assembly and said backrest frame assembly and wherein said attachment features are loops, channels, and hooks, and wherein said loops have a first end and a second end extending outwardly from said surface disposed opposite said portion of said integral exterior surface forming a closed u-shape with said surface disposed opposite said portion of said integral exterior surface, wherein said channels have a general u-shape opening rearwardly from said surface disposed opposite said portion of said integral exterior surface, and wherein said hooks extend outwardly from said surface disposed opposite said portion of said integral exterior surface and opening at least one of upwardly and downwardly forming at least one of a generally U-shape and V-shape with said integral exterior surface, and wherein said loops, channels, and hooks provide a retention mechanism for slidably engaging and attaching at least one of said seat cushion and said backrest to said at least one of said seat cushion frame assembly and said backrest frame assembly.

\* \* \* \* \*